United States Patent [19]
Ishibashi et al.

[11] Patent Number: 5,333,134
[45] Date of Patent: Jul. 26, 1994

[54] CONNECTION HOLD CONTROL SYSTEM

[75] Inventors: Ryoichi Ishibashi; Tohio Irie; Eisuke Iwabuchi, all of Kawasaki, Japan

[73] Assignee: Fujitsu Limited, Kawasaki, Japan

[21] Appl. No.: 824,284

[22] Filed: Jan. 23, 1992

[30] Foreign Application Priority Data

Jan. 24, 1991 [JP] Japan .................................. 3-006801

[51] Int. Cl.$^5$ ........................................... H04L 12/56
[52] U.S. Cl. .................. 370/94.1; 370/110.1
[58] Field of Search ............... 370/94.1, 60, 62, 110.1; 379/97, 215

[56] References Cited

U.S. PATENT DOCUMENTS 4,995,074  2/1991  Goldman et al. ...................... 379/97

FOREIGN PATENT DOCUMENTS

| 108854 | 6/1983 | Japan | H04M 3/42 |
| 111732 | 5/1988 | Japan | H04B 7/26 |
| 134047 | 5/1990 | Japan | H04M 1/00 |

OTHER PUBLICATIONS

Ohnishi et al., "Flow Control Schemes and Delay/Loss Tradeoff in ATM Networks", *IEEE Journal On Selected Areas in Communications*, vol. 6, No. 9, Dec. 1988, pp. 1609–1616.
Patent Abstracts of Japan, vol. 14, No. 67 (E-885), Feb. 7, 1990 for JP-A-1286649, Nov. 17, 1989.
Patent Abstracts of Japan, vol. 11, No. 351 (E-557), Nov. 17, 1987 for JP-A-62130051, Jun. 12, 1987.
European Search Report, The Hague, search completed Jun. 23, 1993.
"High-Performance Parallel Interface", Mechanical, Electrical and Signalling Protocol Specification (HPPI-PH), Preliminary Draft Proposed American National Standard for Information Systems, Dec. 11, 1989.

*Primary Examiner*—Douglas W. Olms
*Assistant Examiner*—Russell Blum
*Attorney, Agent, or Firm*—Staas & Halsey

[57] ABSTRACT

A connection hold control system is adapted to a data communication system in which a data communication is alternately made between a first terminal and a second terminal and between the first terminal and a third terminal, where each of the first through third terminals is coupled to a communication network via a terminal adapter. The connection hold control system includes a hold part, provided within a first terminal adapter which is coupled to the first terminal, for holding a first channel which connects the first and second terminals via the communication network and the terminal adapters after a data communication from the first terminal to the second terminal ends, and a connect part, provided within the first terminal adapter, for connecting the first and second terminals via the first channel if a data communication from the first terminal to the third terminal via a second channel ends within a predetermined time after the data communication from the first terminal to the second terminal ends.

20 Claims, 19 Drawing Sheets

CONNECTION HOLD CONTROL SYSTEM

BACKGROUND OF THE INVENTION

The present invention generally relates to connection hold control systems, and more particularly to a connection hold control system which holds a channel connection during a data communication between terminals which are respectively coupled to a communication network via a terminal adapter.

A terminal may be provided with an interface which can be connected directly to a network such as a public communication network. But if the terminal cannot be connected directly to the communication network, the terminal is coupled to the communication network via a terminal adapter and the communication is made by exchanging protocols.

For example, a data communication may be made by coupling a terminal which is provided with a high performance parallel interface (HIPPI) to a communication network such as a broadband integrated services digital network (B-ISDN) which transmits data in the asynchronous transfer mode (ATM). The HIPPI is used when transmitting data in parallel in one direction at a high speed. The B-ISDN which employs the ATM will hereinafter be referred to as the ATM network. In this case, a terminal adapter (TA) is interposed between the terminal and the ATM network. The HIPPI protocol of the transmitting terminal must be converted into the ATM protocol in the transmitting side terminal adapter so as to carry out an exchange/transmission within the ATM network, and the receiving side terminal adapter must again convert the ATM protocol into the HIPPI protocol before transferring it to the receiving terminal. Although the HIPPI is designed for the terminal which transmits in one direction at a high speed, the control information only is transmitted from the receiving side to the transmitting side. Hence, a conversion similar to the above is also carried out with respect to the control information in the reverse direction.

FIG. 1 is a diagram for explaining the network structure described above. In FIG. 1, three terminals 62-1 through 62-3 (TE#1 through TE#3) are coupled to an ATM network 60 via respective terminal adapters 61-1 through 61-3. The three terminals 62-1 through 62-3 are respectively provided with the HIPPI, and the HIPPIs are interposed between the terminals 62-1 through 62-3 and the corresponding terminal adapters 61-1 through 61-3.

When making a communication among the terminals 62-1 through 62-3, the terminal adapter converts the HIPPI protocol into the ATM protocol and makes the communication via the ATM network 60.

In order to transmit data in the network structure described above, a connection is set by setting from the transmitting side terminal adapter a communication path (hereinafter referred to as a channel) from the transmitting terminal to the receiving terminal via the ATM network 60. For example, if one terminal 62-1 shown in FIG. 1 it to alternately transmit data to the two terminals 62-2 and 62-3, the terminal adapter 61-1 must release the previous channel every time a request to switch the destination is generated from the transmitting terminal 62-1 and a channel must be set with respect to the next destination.

However, a certain time is required to set the connection. The time required to set the connection becomes large particularly in the case of a data communication in which the destination is switched frequently, and the data communication efficiency becomes poor in this case. For this reason, there is a demand to realize a method of setting the connection which can improve the data communication efficiency.

FIG. 2 shows the structure of a conventional terminal adapter which is used between the ATM network and the terminal which is provided with the HIPPI. FIG. 3 is a sequence diagram for explaining the operation of the prior art.

First, a description will be given of a method of setting a connection in the HIPPI.

The transmitting terminal (not shown) makes a connection request with respect to the transmitting side terminal adapter in order to transmit data, and this connection request is made by turning ON the REQUEST shown in FIG. 2. At the same time, data (hereinafter referred to as connection information) including destination information and the like are transmitted on a data line DATA to the terminal adapter in 32 parallel bits, for example. A data part in which the connection information is transmitted is called an I field, and the actual data is transmitted following this I field.

At the transmitting side terminal adapter shown in FIG. 2, a HIPPI connection management part 71 receives the above information via a transmission interface part 72 and carries out a control so as to turn ON the REQUEST and send the REQUEST to an ATM cell generating part 74 together with the connection information which is input to a transmission buffer 73. According to the ATM, the control information and data are transferred in units of cells respectively made up of 53 bytes, as is well known. The REQUEST which is ON and the data (connection information) of the I field are formed into one cell in the ATM cell generating part 74, and is transmitted to the ATM network (not shown) via a physical layer transmission processing part 78. This cell is thus transmitted to the receiving side terminal adapter (not shown) and the receiving terminal (not shown) via the ATM network. The transmission buffer 73 and a reception buffer 77 are normally made up of a first-in-first-out (FIFO) which stores and outputs the incoming data.

When the receiving terminal receives the cell from the transmitting terminal via the ATM network, the receiving terminal turns ON the CONNECT and returns the CONNECT to the transmitting side. The CONNECT is received as a cell by an ATM cell reception processing part 75 via a physical layer reception processing part 79 shown in FIG. 2, and this cell is converted into the HIPPI format before being sent to a HIPPI connection management part 71. The HIPPI connection management part 71 turns ON the CONNECT which is supplied to the transmitting terminal via the transmission interface part 72. The CONNECT which is ON indicates a connection set completion signal.

When using the terminal adapter shown in FIG. 2 on the receiving side, the connection information, data and the like which are received are sent from the ATM cell reception processing part 75 to the receiving terminal via the reception buffer 77 and a reception interface part 76.

When the data transmission ends, the transmitting terminal turns OFF the REQUEST, and this REQUEST which is OFF is regarded as a connection release request. The OFF REQUEST is transmitted to the receiving terminal similarly as described above, and the receiving terminal turns OFF the CONNECT when the OFF REQUEST is received. The OFF CONNECT is transmitted to the transmitting terminal similarly as described above, and the OFF CONNECT is regarded as a connection release acknowledgement signal.

FIG. 3 shows the sequence for the network structure shown in FIG. 2 in a case where the data is transmitted from the terminal TE#1 to the terminals TE#2 and TE#3. In FIG. 3, REQ-1/REQ-0 indicates the REQUEST which is ON/OFF, and CON-1/CON-0 indicates the CONNECT which is ON/OFF. In addition, REQ-1+I indicates that the connection information is transmitted in the I field together with the REQ-1. Parts of the sequence are denoted by "a" through "q" with the exception of letters "l" and "o" which are not used.

First, when it is assumed that the data transmission is made from the terminal TE#1 to the terminal TE#2, the terminal TE#1 makes a connection request by REQ-1 as shown by "a" and notifies the terminal adapter TA#1 that the destination is the terminal TE#2 by the I field. The REQ-i+I is formed into a cell in the terminal adapter TA#1, and is sent to the terminal adapter TA#2 via the ATM network. The terminal adapter TA#2 sends the cell which is received via the ATM network to the terminal TE#2. The terminal TE#2 returns CON-1 to the terminal TE#1 as shown by "b" to confirm the receipt of the REQ-1 via a reverse route. As a result, a channel is set between the terminals TE#1 and TE#2, and it becomes possible to transmit data from the terminal TE#1 to the terminal TE#2 as shown by "c".

When the data transmission ends, the terminal TE#1 makes a connection release request by REQ-0 and CON-0 is returned from the receiving side similarly as described above as shown by "d" and "e". Hence, the channel between the terminals TE#1 and TE#2 becomes disconnected.

Next, when the data transmission is made from the terminal TE#1 to the terminal TE#3, a sequence similar to that described above is carried out as shown by "f" through "j". Furthermore, if the data is to be transmitted to the terminal TE#2 again after the data transmission from the terminal TE#1 to the terminal TE#3, a sequence is carried out as shown by "k" through "q".

Therefore, a time $\tau$ for setting and releasing the channel is required with respect to a time $\alpha$ in which the data is transmitted every time a data transmission is made. For this reason, when alternately transmitting data to a plurality of terminals as described above, the time required to set and release the channel becomes large relative to the data transmission time, and there is a problem in that the data transmission efficiency becomes poor.

SUMMARY OF THE INVENTION

Accordingly, it is a general object of the present invention to provide a novel and useful connection hold control system in which the problems described above are eliminated.

Another and more specific object of the present invention is to provide a connection hold control system for a data communication system in which a data communication is alternately made between a first terminal and a second terminal and between the first terminal and a third terminal, where each of the first through third terminals is coupled to a communication network via a terminal adapter and the connection hold control system comprises hold means, provided within a first terminal adapter which is coupled to the first terminal, for holding a first channel which connects the first and second terminals via the communication network and the terminal adapters after a data communication from the first terminal to the second terminal ends, and connect means, provided within the first terminal adapter, for connecting the first and second terminals via the first channel if a data communication from the first terminal to the third terminal via a second channel ends within a predetermined time after the data communication from the first terminal to the second terminal ends. According to the connection hold control system of the present invention, it is possible to greatly reduce the time required to re-set a channel which is previously used for a data communication by holding the channel for the predetermined time. Hence, the data transmission efficiency is improved, and the communication efficiency is particularly improved when applied to a high speed data communication.

Still another object of the present invention is to provide a connection hold control system described above wherein the hold means includes means for sending a connection release acknowledge signal which indicates a release of the first channel to the first terminal while holding the first channel when a connection release request signal is received from the first terminal after the first terminal adapter sets the first channel with respect to the second terminal via the communication network, and means for releasing the first channel which is held after the predetermined time elapses from a time when the first channel is held, and the connect means includes re-connect means for immediately enabling a data communication via the first channel which is held if a connection request to the second terminal is received from the first terminal before the predetermined time elapses from the time when the first channel is held.

A further object of the present invention is to provide a connection hold control system of the type described first wherein the connect means includes connection switch means for setting the second channel to the third terminal while holding the first channel to the second terminal if a connection request to the third terminal is received from the first terminal in a state where the first channel to the second terminal is held.

Another object of the present invention is to provide a connection hold control system of the type described first wherein the first terminal alternately receives data from the second and third terminals via the communication network and the terminal adapters, and the connection hold control system further comprises plural data storage means, provided within the first terminal adapter, for temporarily storing the data received from the second and third terminals when the data is received from the second terminal in a state where a channel connecting the third terminal and the first terminal adapter is held, and for transmitting the stored data to the first terminal independently for each terminal from which the data is received.

Still another object of the present invention is to provide a connection hold control system of the type described first which further comprises hold release request signal transmitting means, provided within the first terminal, for sending a hold release request signal which requests a release of the first channel which is held to the first terminal adapter using a part of a control signal after sending a connection release request signal to the first terminal adapter at an end of a data transmission using the first channel, and hold release means, provided within the first terminal adapter, for carrying out a connection release process with respect to the second terminal via the communication network in response to the hold release request signal.

A further object of the present invention is to provide a connection hold control system of the type described first which further comprises hold disuse information transmitting means, provided within the first terminal, for transmitting to the first terminal adapter hold disuse information which indicates no need to hold the first channel after the data transmission to the second terminal ends if it is known in advance at the time when the connection request is made from the first terminal that the holding of the first channel to the second terminal is unnecessary after the data transmission to the second terminal ends, the hold disuse information being included in connection information which is transmitted together with a connection request signal which is transmitted with respect to the second terminal, and non-hold connection processing means, provided within the first terminal adapter, for immediately carrying out a connection release process in response to the hold disuse information without holding the first channel which is set by the connection request signal when a connection release request is received from the first terminal at the end of the data transmission to the second terminal.

Another object of the present invention is to provide a connection hold control system of the type described first which further comprises hold release request information transmitting means, provided within the first terminal, for transmitting hold release request information which is made up of information which specifies the first terminal adapter as a destination and information which requests release of the first channel which is used for an immediately preceding data transmission to the second terminal, where the hold release request information is included in connection information which is transmitted together with a connection request signal after the data transmission to the second terminal ends, and hold release request information processing means, provided within the first terminal adapter, for releasing the first channel which is used for the immediately preceding data transmission to the second terminal which ended when the hold release request information is received from the first terminal together with the connection request signal.

Still another object of the present invention is to provide a connection hold control system of the type described first which further comprises terminal adapter specifying means, provided within the first terminal, for transmitting terminal adapter specifying information which specifies the first terminal adapter as a destination, where the terminal adapter specifying information is included within connection information which is transmitted together with a connection request signal, connection hold control request transmitting means, provided within the first terminal, for transmitting as data identification information related to one of the second and third terminals to which a control request is to be made and connection hold control request information which includes a control request content selected from a group consisting of connect, connection release, hold and hold release, terminal adapter communication identifying means, provided within the first terminal adapter, for carrying out a control to process data which is received from the first terminal following the terminal adapter specifying information within the first terminal adapter without transmitting the data to the communication network, and terminal request processing means, provided within the first terminal adapter, for carrying out a process of connect, connection release, hold and hold release with respect to one of the second and third terminals which is specified by the connection hold control request information included in the data which is received from the first terminal following the terminal adapter specifying information, so that a connection hold control is possible with respect to an arbitrary terminal by a data communication between the terminal and the terminal adapter.

Other objects and further features of the present invention will be apparent from the following detailed description when read in conjunction with the accompanying drawings.

DESCRIPTION OF THE PREFERRED EMBODIMENTS

Figure 1:
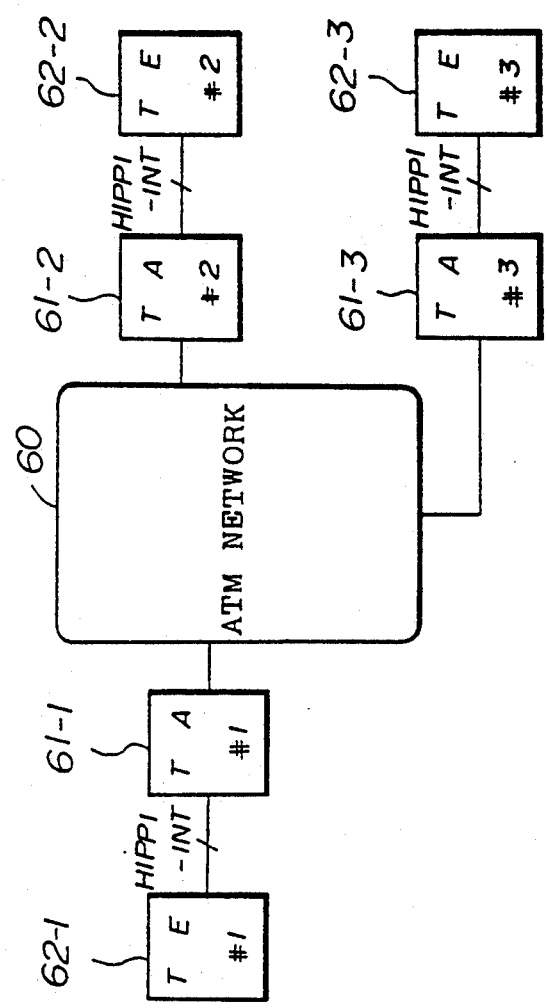
FIG. 1 is a system block diagram showing an example of a conventional network structure.

First, a description will be given of an operating principles of the present invention, by referring to FIGS. 4 through 10.

In FIGS. 4 through 10, 21 through 27 denote terminal adapters and 31 through 37 denote terminals. In addition, means 1 through 14 form essential parts of the present invention, and are applied to a data communication system in which the data is transmitted and received between terminals which are coupled to a communication network via respective terminal adapters. Among the means 1 through 14, some are used in common for a plurality of kinds of terminal adapters 21 through 27 or terminals 31 through 37, and thus, the terminal adapters 21–27 will be referred to by reference numeral 20 and the terminals 31–37 will be referred to by reference numeral 30.

The hold means 1 is provided within the transmitting side terminal adapter 20. After the terminal adapter 20 sets a channel with respect to the destination terminal via the communication network, the hold means 1 transmits a connection release acknowledge signal upon receipt of a connection release request signal from the transmitting terminal 30 so as to notify the release of the channel to the terminal 30 in the state where the channel is held. In addition, the hold means 1 carries out a channel hold cancel process after a predetermined time elapses from the time when the connection release acknowledge signal is transmitted.

The re-connect means 2 is provided within the transmitting side terminal adapter 20. If the transmitting terminal 30 makes a connection request to the same destination terminal before the predetermined time elapses, the re-connect means 2 immediately enables a communication via the channel which is being held.

A connection switch means 3 is provided within the transmitting side terminal adapter 20. When the channel with respect to a first destination terminal is held by the hold means 1 and a connection request with respect to a second destination terminal is received from the transmitting terminal 30, the connection switch means 3 sets the channel to the second destination terminal while holding the channel with respect to the first destination terminal.

The plural data storage means 4 is provided within the receiving side terminal adapter 20. When the terminal adapter 20 is held by a first transmitting terminal and data is received from a second transmitting terminal via the communication network, the plural data storage means 4 temporarily stores the data received from the first and second transmitting terminals, and transmits the received data to the receiving terminal 30 independently for each transmitting terminal.

The hold release request signal transmitting means 5 is provided within the transmitting terminal 30. When there is no need for the terminal 30 to hold the channel with respect to the destination terminal, the hold release request signal transmitting means 5 uses a part of a control signal to transmit to the terminal adapter 20 a hold release request signal which requests the release of the held channel after transmitting the connection release request signal to the terminal adapter 20 at the end of the data transmission.

The hold release means 6 is provided within the transmitting side terminal adapter 20. The hold release means 6 carries out a connection release process with respect to the destination terminal via the communication network when the hold release request signal is received from the transmitting terminal 30.

The hold disuse information transmitting means 7 is provided within the transmitting terminal 30. If it is known at the time when the terminal 30 makes the connection request with respect to the destination terminal that there is no need to hold the channel with respect to the destination terminal after the data transmission ends, the hold disuse information transmitting means 7 transmits to the terminal adapter 20 hold disuse information which indicates that there is no need to hold the channel after the data transmission ends. This hold disuse information is included in the connection information which is transmitted together with the connection request signal with respect to the destination terminal.

The non-hold connection processing means 8 is provided within the transmitting side terminal adapter 20. When the hold disuse information is received, the non-hold connection processing means 8 immediately carries out a connection release process without holding the channel which is set by the connection request signal when the connection release request signal is received from the terminal 30 at the end of the data transmission.

The hold release request information transmitting means 9 is provided within the transmitting terminal 30. The hold release request information transmitting means 9 transmits the connection information together with the connection request after the data transmission to the destination terminal ends, so that hold release request information is included in the connection information which is transmitted. The hold release request information is made up of information which specifies the terminal adapter 20 as the destination and information which requests release of the channel being held for a destination terminal to which data transmission ended immediately before.

The hold release request information processing means 10 is provided within the transmitting side terminal adapter 20. The hold release request information processing means 10 carries out a process of releasing the channel which is held with respect to the destination terminal the data transmission to which ends immediately before when the hold release request information is received together with the connection request signal from the transmitting terminal 30.

The terminal adapter specifying means 11 is provided within the transmitting terminal 30. The terminal adapter specifying means 11 transmits terminal adapter specifying information for specifying the terminal adapter 20 which is coupled as the destination within the connection information which is transmitted together with the connection request signal. The connection hold control request transmitting means 12 is also provided within the transmitting terminal 30. The connection hold control request transmitting means 12 transmits as data identification information of the destination terminal which is the subject of the control request and connection hold control request information. The connection hold control request information includes control request contents such as connect, connection release, hold and hold release.

The terminal adapter communication identifying means 13 is provided within the transmitting side terminal adapter 20. When the terminal adapter specifying information is received from the transmitting terminal 30, the terminal adapter communication identifying means 13 carries out a control so that the following data which is received is not transmitted to the communication network but is processed within its own terminal adapter 20. The terminal request processing means 14 is also provided within the transmitting side terminal adapter 20. When data is received after receiving the terminal adapter specifying information from the terminal 30, the terminal request processing means 14 carries out a process such as the connect, connection release, hold and hold release with respect to the specified destination terminal according to the connection hold control request information included in the data.

Figure 4:
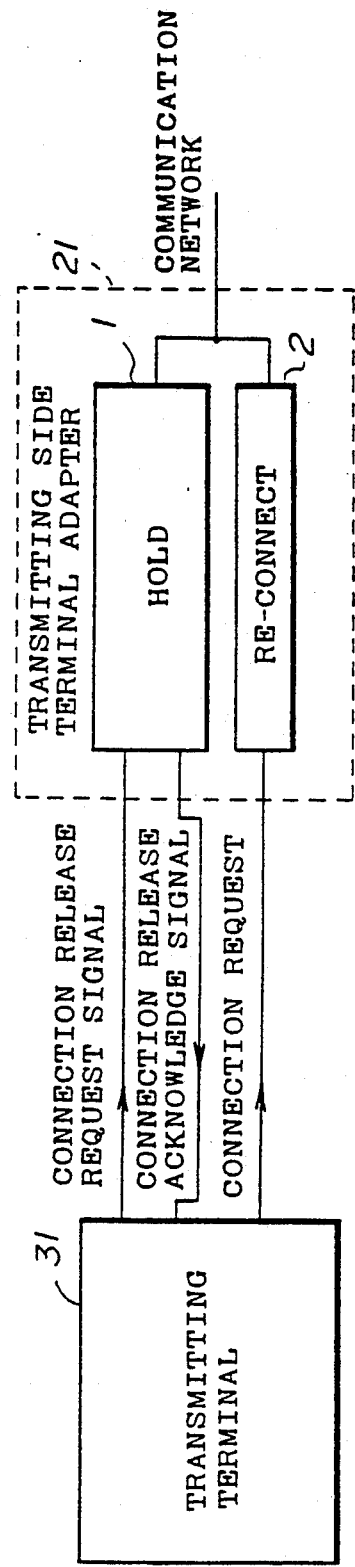
FIGS. 4 through 10 are system block diagrams for explaining the operating principles of the present invention.

In FIG. 4, when the connection release request signal is received from the terminal 31, the terminal adapter 21 does not release the channel immediately, but releases the channel after holding the channel for a predetermined time. In addition, if the connection request with respect to the same destination terminal is made from the terminal 31 before the predetermined time elapses, the re-connect means 2 immediately enables a communication via the channel which is being held. For this reason, it is possible to reduce the time required to set the channel when the transmitting terminal connects to the same destination terminal at short time intervals.

Figure 5:
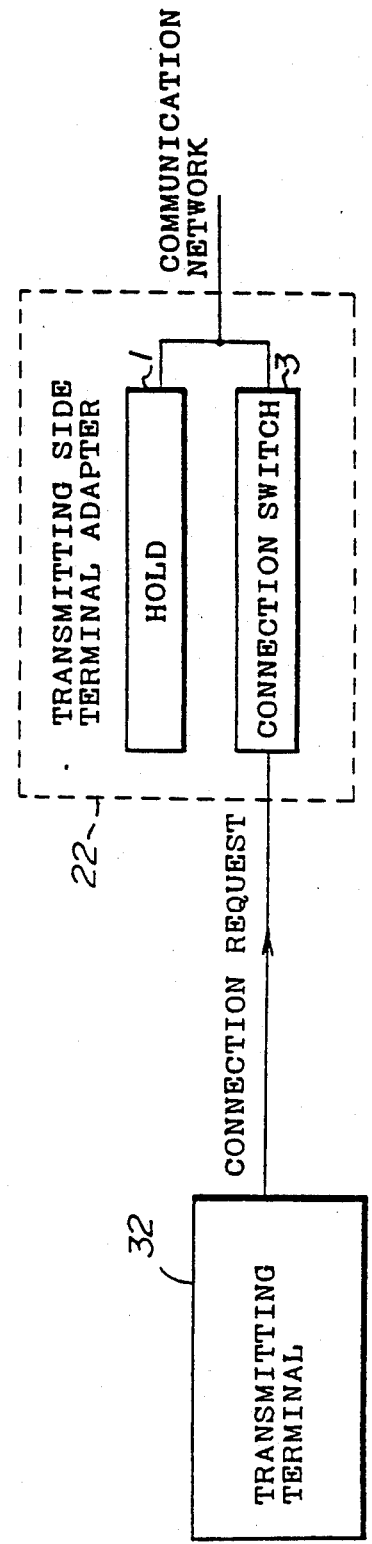

In FIG. 5, when the channel with respect to the first destination terminal is held by the hold means 1 and the terminal adapter 22 receives from the terminal 32 the connection request with respect to the second destination terminal, the connection switch means 3 sets the channel to the second destination terminal while holding the channel with respect to the first destination terminal. Hence, it is possible to transmit data to a destination terminal even in a state where a channel previously used for data transmission to another destination terminal is being held. In addition, the time required to set the channel can be reduced when alternately switching the destination terminal.

Figure 6:
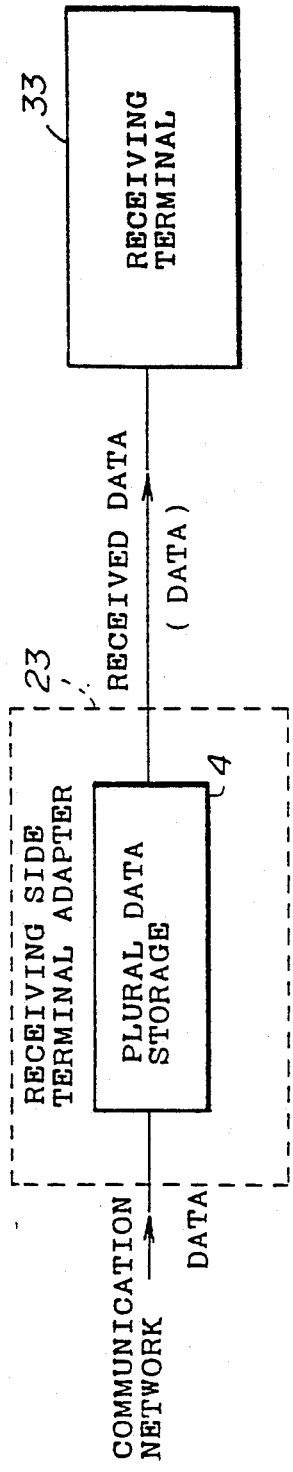

In FIG. 6, when the receiving side terminal adapter 23 is held from the first transmitting terminal and the data is received from the second transmitting terminal via the communication network, the plural data storage means 4 temporarily stores the data received from the first and second transmitting terminals. Hence, the received data can be transmitted to the terminal 33 independently for each transmitting terminal, and the reception from other transmitting terminals will not be prevented even if the receiving side terminal adapter 23 is held by another transmitting terminal.

Figure 7:
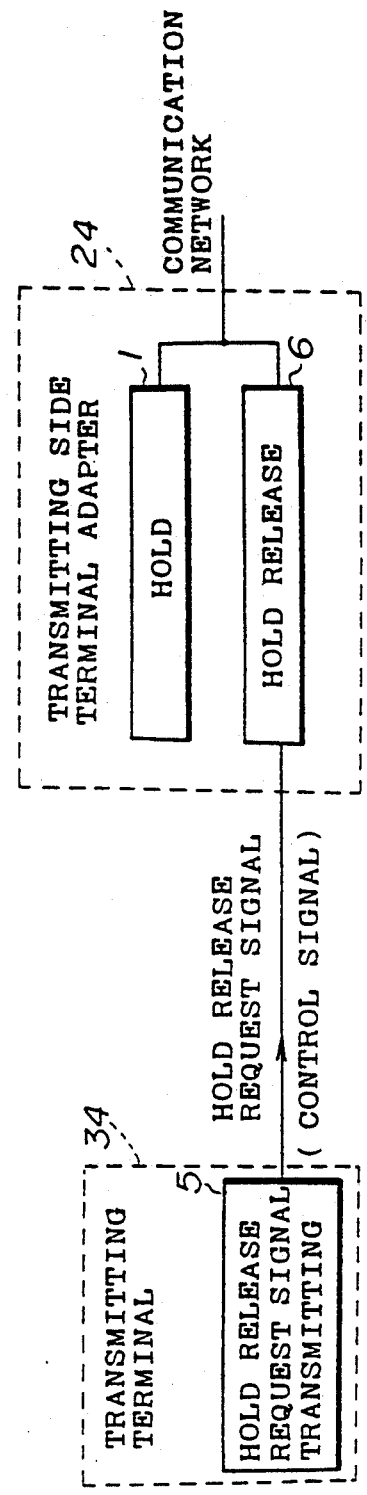

In FIG. 7, if the transmitting terminal 34 does not need to hold the channel with respect to the destination terminal, the connection release request signal is transmitted to the terminal adapter 24 at the end of the data transmission. Thereafter, a part of the control signal is used to transmit the hold release request signal from the hold release request signal transmitting means 5 so as to request the release of the channel which is held. At the terminal adapter 24 which receives the hold release request signal, the hold release means 6 carries out the connection release process with respect to the destination terminal so as to release the held channel, thereby preventing unnecessary holding of the channel.

Figure 8:
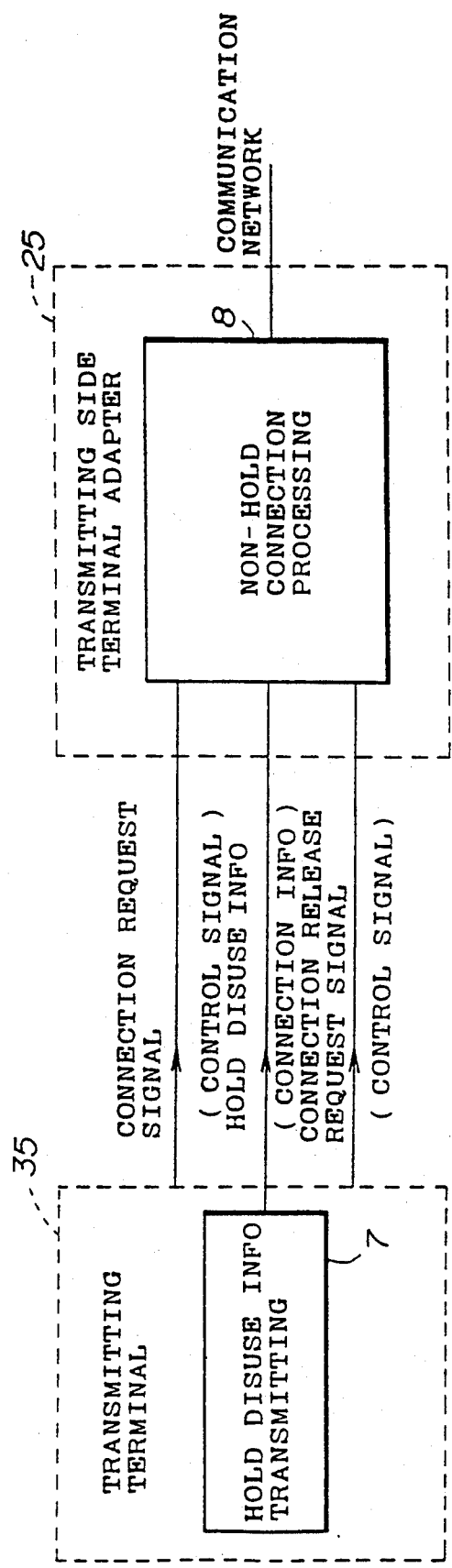

In FIG. 8, if it is known at the time when the transmitting terminal 35 makes the connection request with respect to the destination terminal that there is no need to hold the channel with respect to the destination terminal after the data transmission ends, the hold disuse information transmitting means 7 transmits to the terminal adapter 25 the hold disuse information which indicates that there is no need to hold the channel after the data transmission ends. This hold disuse information is included in the connection information which is transmitted together with the connection request signal with respect to the destination terminal. At the terminal adapter 25 which receives this hold disuse information, it is possible to immediately carry out the connection release process for the communication in which the hold disuse information is received, without holding the channel which is used when the connection release request signal is received at the end of the data communication. For this reason, the unnecessary holding of the channel is prevented.

Figure 9:
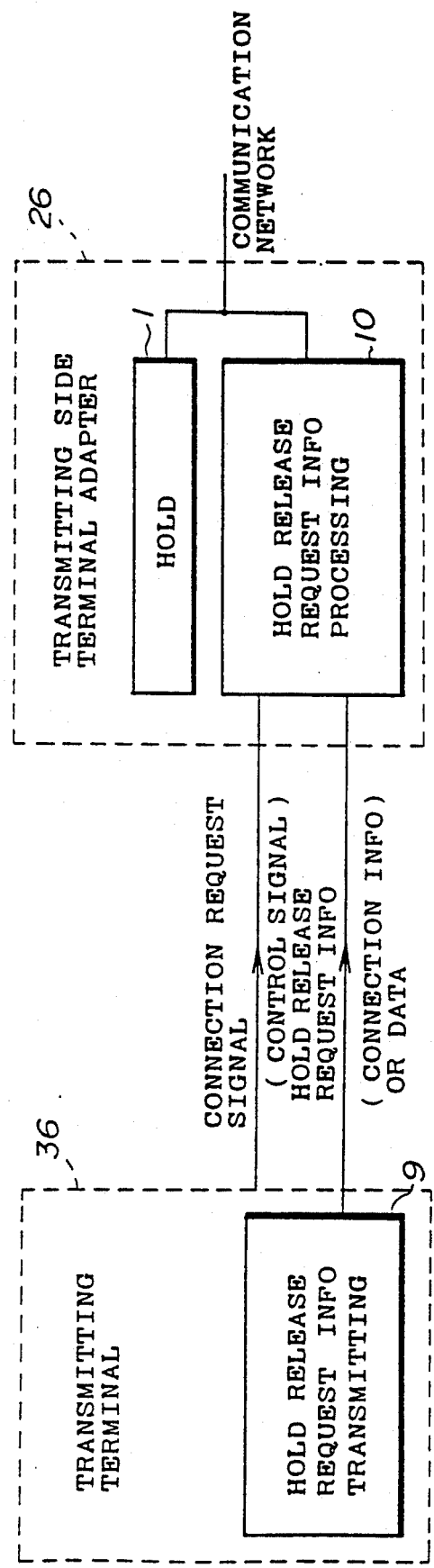

In FIG. 9, the hold release request information transmitting means 9 within the transmitting terminal 36 transmits the connection information together with the connection request signal after the data transmission to the destination terminal ends, so that hold release request information is included in the connection information which is transmitted. The hold release request information is made up of information which specifies the terminal adapter 26 as the destination and information which requests release of the channel being held for a destination terminal the data transmission ended immediately before. When the terminal adapter 26 receives the hold release request information together with the connection request signal from the terminal 36, the hold release request information processing means 10 carries out the process to release the channel which is held for the destination terminal to which the data transmission ended immediately before. Hence, the unnecessary holding of the channel is prevented as in the case of FIG. 7.

Figure 10:
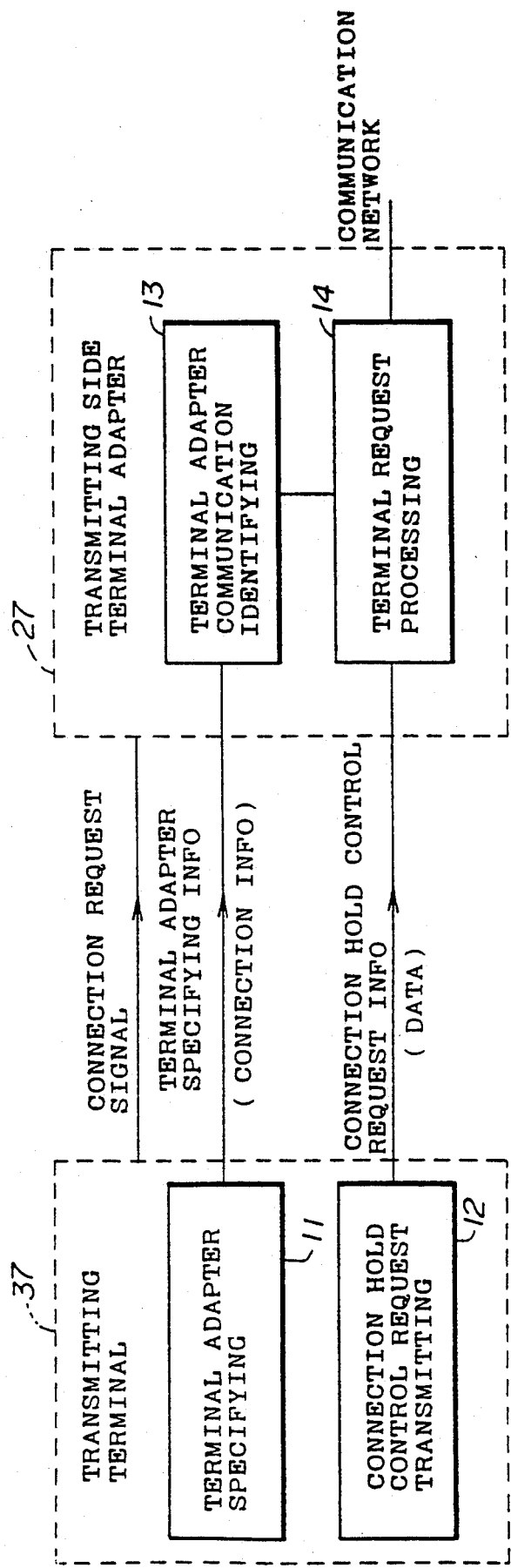

In FIG. 10, the terminal adapter specifying means 11 within the transmitting terminal 37 specifies the terminal adapter 27 which is coupled as the data destination. When the connection hold control request transmitting means 12 transmits the identification information of the destination terminal which is the subject of the control request and the connection hold control request information which includes control request contents such as connect, connection release, hold and hold release to the terminal adapter 27 as data, the terminal adapter communication identifying means 13 of the terminal adapter 27 carries out a control so that the data which is received following the terminal adapter specifying information is not transmitted to the communication network but is processed within its own terminal adapter 27. In addition, since the terminal request processing means 14 carries out a process such as the connect, connection release, hold and hold release with respect to the specified destination terminal according to the connection hold control request information which is received following the terminal adapter specifying information, it is possible to make a data communication between the terminal and the terminal adapter. As a result, a connection hold control can be made freely with respect to an arbitrary destination terminal.

Figure 11:
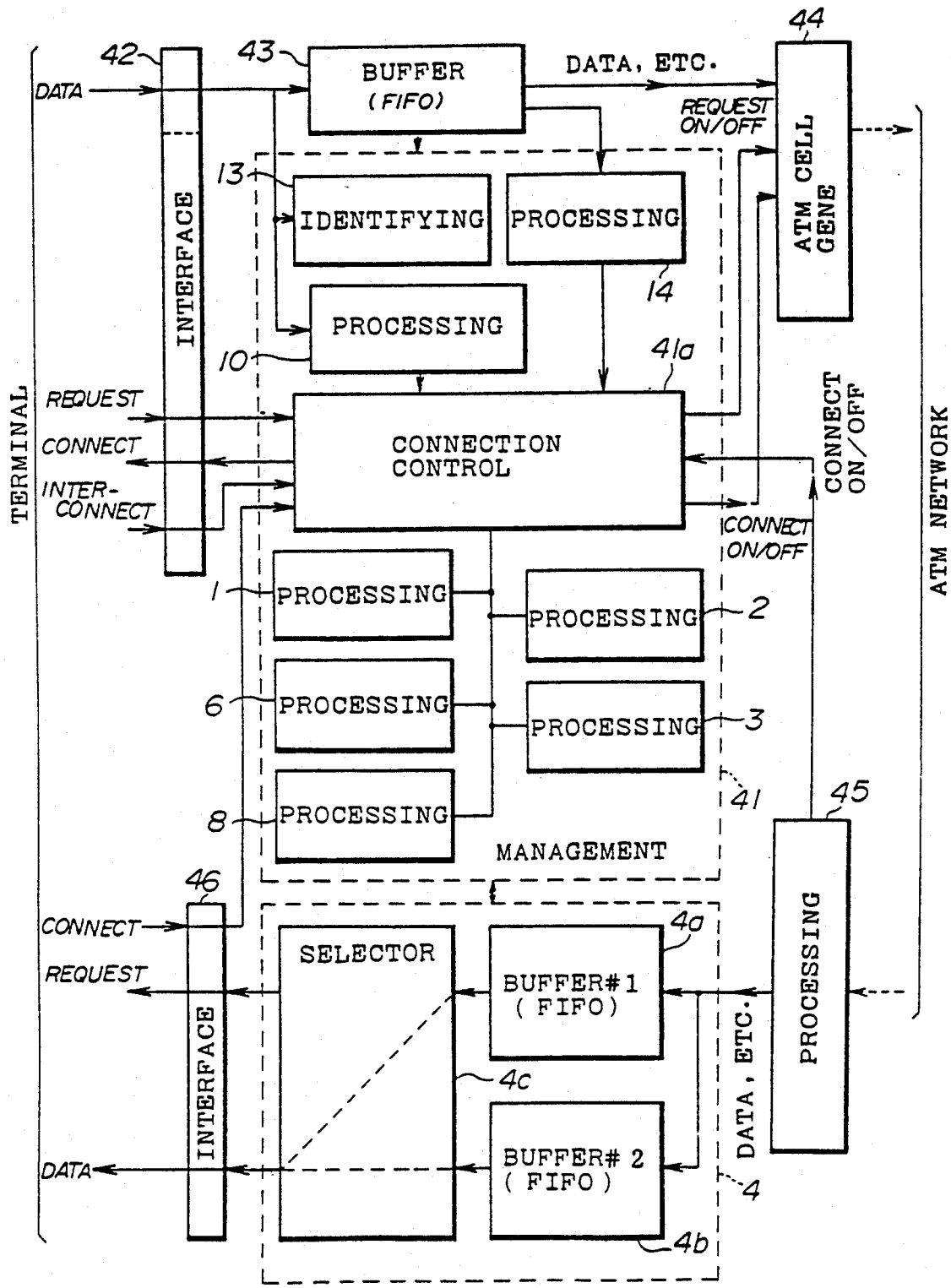
FIG. 11 is a system block diagram showing an embodiment of a terminal adapter which is used in an embodiment of a connection hold control system according to the present invention.
Figure 12:
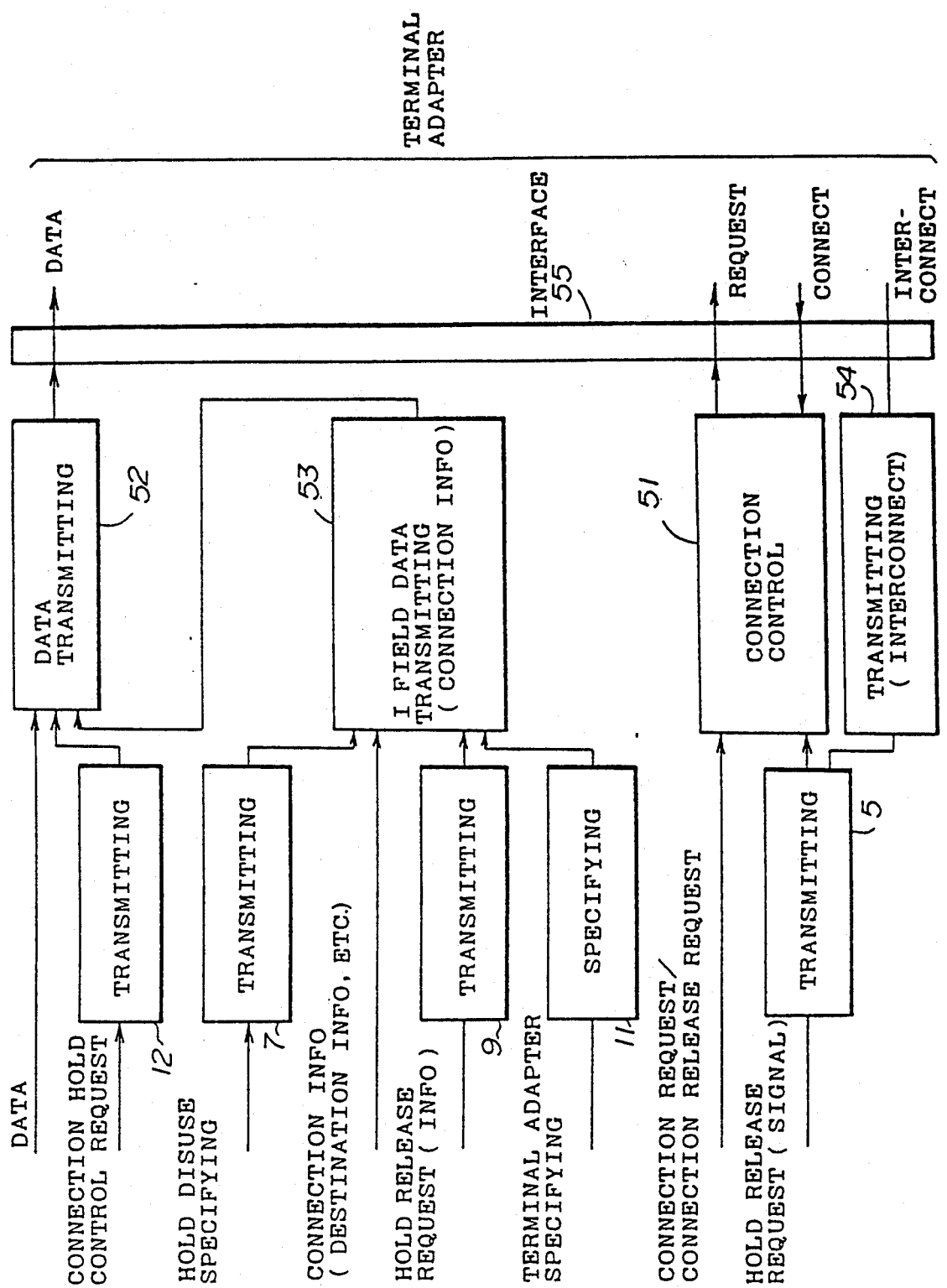
FIG. 12 is a system block diagram showing an embodiment of a terminal which is used in the embodiment of the connection hold control system according to the present invention.
Figure 13:
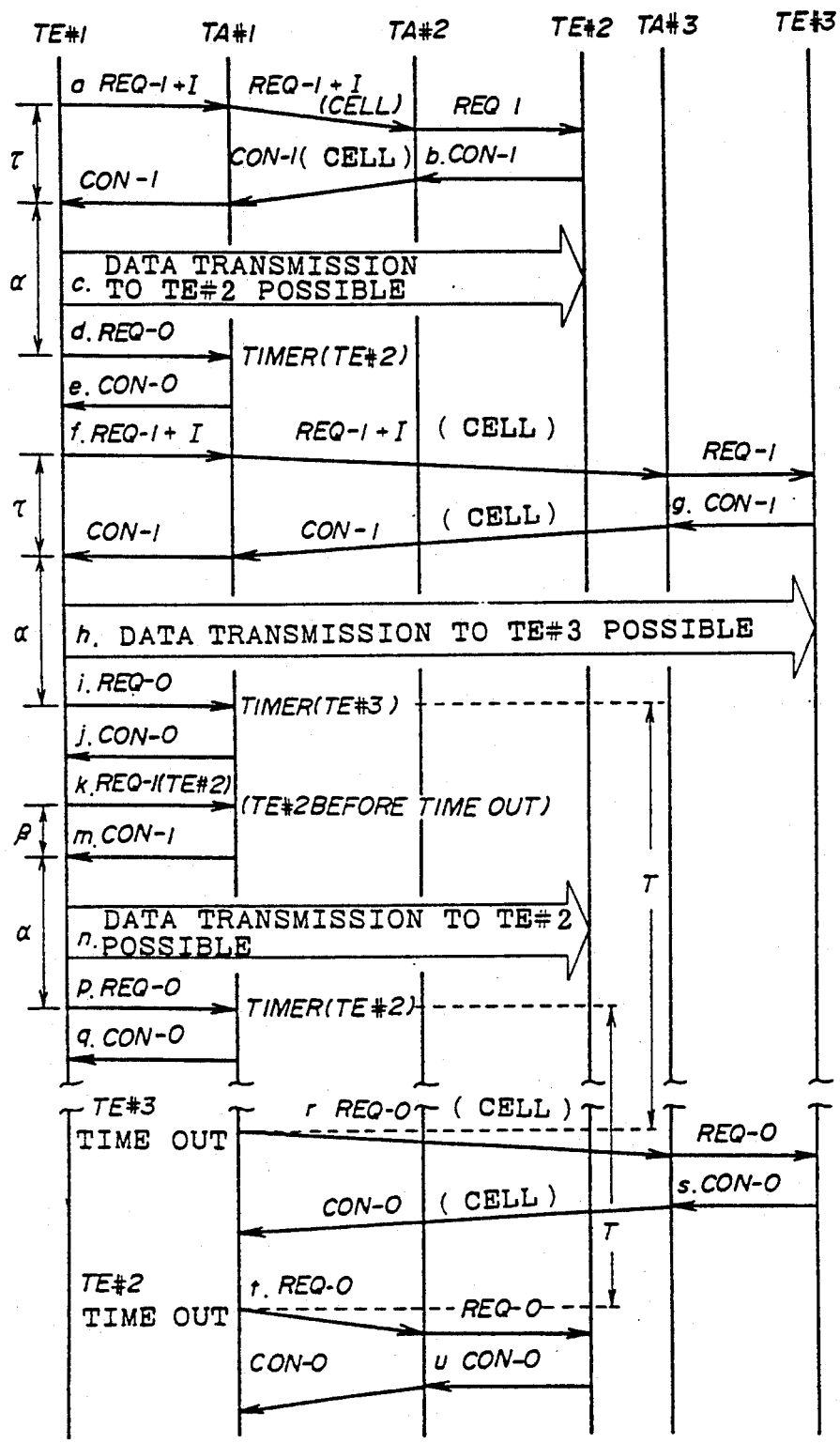
FIG. 13 is a basic sequence diagram for explaining the operation of the embodiment of the connection hold control system according to the present invention.
Figure 14:
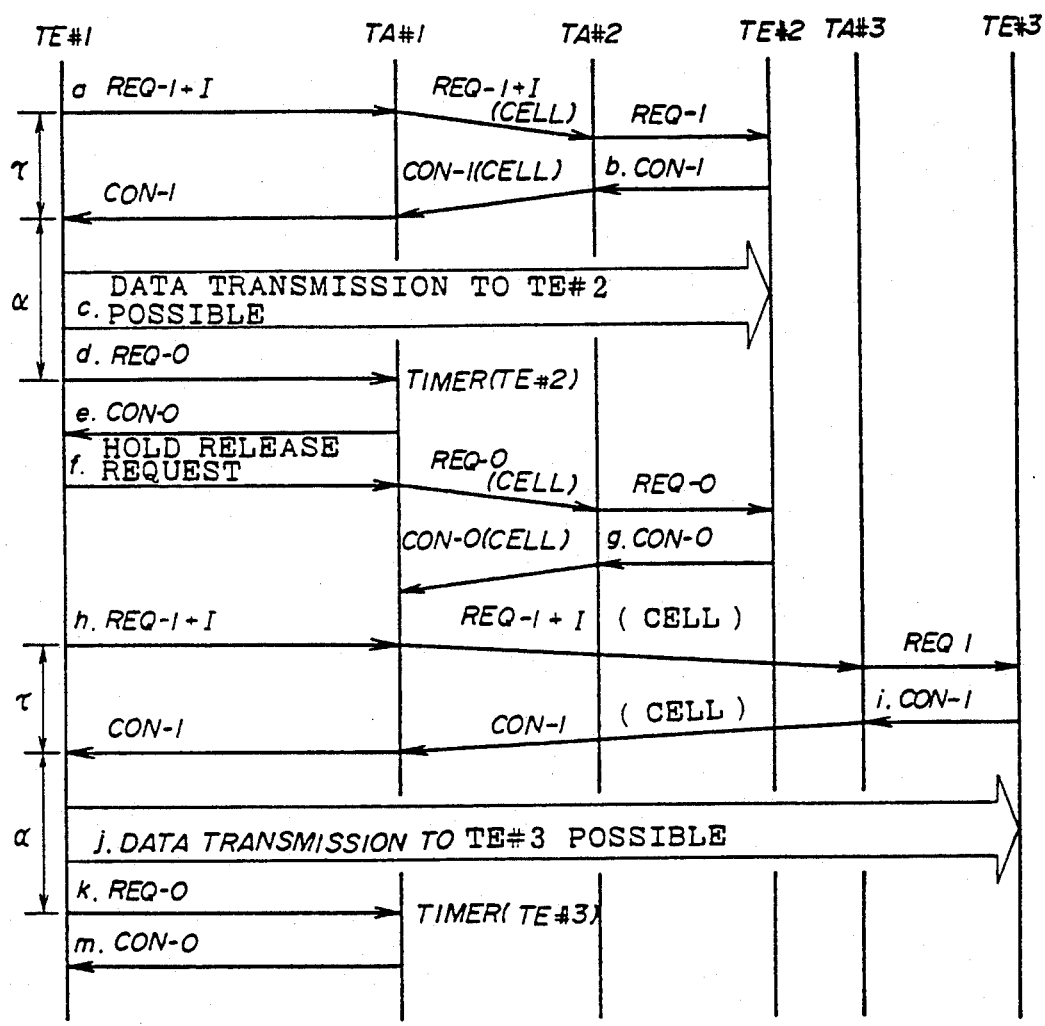
FIG. 14 is a sequence diagram for explaining a hold release sequence of the embodiment of the connection hold control system according to the present invention.

Next, a description will be given of an embodiment of the connection hold control system according to the present invention. FIG. 11 shows an embodiment of the terminal adapter used in this embodiment, and FIG. 12 shows an embodiment of the terminal which is used in this embodiment. FIG. 13 shows a basic sequence of this embodiment, and FIG. 14 shows a hold release sequence of this embodiment.

FIGS. 11 and 12 respectively show the terminal adapter and the connection hold control part of the terminal, for realizing the principles explained above in conjunction with FIGS. 4 through 10. In FIGS. 11 and 12, those parts which are the same as those corresponding parts in FIGS. 4 through 10 are designated by the same reference numerals, and a description thereof will be omitted.

In FIG. 11, the plural data storage part 4 includes reception buffers 4a and 4b, and a 2:1 selector 4c for selecting one of the reception buffers 4a and 4b and transmitting the stored data and the like to the terminal. A HIPPI connection management part 41 manages the connection control of the terminal adapter. This HIPPI connection management part 41 includes a connection control part 41a for carrying out the connection control. The connection control part 41a carries out the connection hold control by coupling to each of the processing parts within the HIPPI connection management part 41. The terminal adapter also includes a transmission interface part 42, a transmission buffer 43, an ATM cell generating part 44, an ATM cell reception processing part 45 and a reception interface part 46.

On the other hand, in FIG. 12, a connection control part 51 carries out the connection control, and a data transmitting part 52 transmits data in 32 parallel bits, for example. An I field data transmitting part 53 transmits the I field data which is formed by 32 bits, for example, that is, transmits the connection information, via the data transmitting part 52. A terminal data indication signal transmitting part 54 transmits an interconnect signal to indicate a state where the terminal with the power source ON is coupled to the HIPPI. An interface part 55 is coupled to the terminal adapter.

Next, a description will be given of the operation of this embodiment by referring to FIGS. 11 and 12. However, the operations of making the normal connection and connection release are the same as those of the prior art described in conjunction with FIGS. 2 and 3, and a description thereof will be omitted. In this embodiment, when the data transmission ends and the connection release request is made from the terminal by the REQUEST which is OFF, it is assumed that the channel is not released to the network for a predetermined time.

After the terminal adapter sets the channel and the data transmission ends, the hold processing part 1 of the terminal adapter shown in FIG. 11 receives the connection release request via the connection control part 41a when the terminal adapter receives the REQEST which is OFF from the connection control part 51 of the terminal. Then, the hold processing part 1 sends the connection release acknowledge signal to the terminal as if it were received from the destination terminal, by the CONNECT which is OFF. Hereafter, the intervention of the connection control part 41a will be omitted from the description for the sake of convenience, except where essential. In this state, the hold processing part 1 starts counting the predetermined time, and starts the connection release process if no connection request with respect to the same destination terminal is received from the terminal while the predetermined time is counted. Hence, the hold processing part 1 releases the previously set channel by sending the REQUEST which is OFF to the ATM cell generating part 44.

If a connection request with respect to the same destination terminal is received from the terminal by the REQUEST which is ON before the predetermined time ends, the re-connect processing part 2 of the terminal adapter immediately returns the CONNECT which is ON to the terminal. For this reason, the terminal can start transmitting the data within an extremely short time. It is possible to confirm whether or not the predetermined time has elapsed because the hold processing part 1 and the re-connect processing part 2 both operate via the connection control part 41a.

When making the request with respect to another terminal while holding the first destination terminal, the connection information including the destination data is transmitted from the I field data transmitting part 53 of the terminal together with the REQUEST which is ON. The connection switch processing part 3 requests the connection process by the connection control part 41a when the connection request is identified within the terminal adapter, and the REQUEST which is ON is transmitted from the connection control part 41a to the new destination terminal via the ATM cell generating part 44.

On the other hand, at the receiving side, the channel is held although the data transmission has ended. When the data is transmitted from another terminal in this state, the data received via the ATM cell reception processing part 45 is stored in one of the two reception buffers 4a and 4b of the plural data storage part 4 independently for each transmitting terminal. The received data is transmitted to the terminal in the form of the REQUEST which is ON/OFF if the received data is the I field data or, transmitted to the data line (DATA) having 32 parallel bits, for example, if the received data is the actual data. In this case, the 2:1 selector 4c selects one of the reception buffers 4a and 4b which stores the data to be transmitted to the terminal. Accordingly, no inconveniences will be introduced by the channel which is held at the receiving side terminal adapter.

Next, a description will be given of the hold release process for the case where the transmitting terminal does not need to hold the channel with respect to the destination terminal. Various kinds of methods may be employed, but a description will be given of the case where the hold release is requested using the control signal after the data transmission ends.

At the terminal, the connection release request signal is transmitted to the terminal adapter by turning the REQUEST OFF at the end of the data transmission. Thereafter, the hold release request signal which requests the release of the held channel is transmitted from the hold release request signal transmitting part 5 using a part of the control signal. More particularly, the REQUEST which is ON and the REQUEST which is OFF are transmitted in succession via the connection control part 51 or, the interconnect signal is turned OFF for a short time via the terminal state indication signal transmitting part 54. One of these methods to be used is decided in advance at the terminal adapter, and the hold release processing part 6 judges whether or not the hold release request signal is received and turns the REQUEST OFF with respect to the network when the hold release request signal is received. As a result, the channel is released without waiting for the predetermined time to elapse in the hold processing part 1.

Next, a description will be given of another method of releasing the held channel using the connection information and not the control signal. In this case, the bit position of the hold release request information is specified in advance in the connection information, the terminal transmits the connection release request signal to the terminal adapter by turning the REQUEST OFF at the end of the data transmission, and the REQUEST is turned ON and transmitted together with the I field data. At the terminal, the information which specifies the terminal adapter and the hold release request information with for the destination terminal to which data transmission ended immediately before are included within the I field data from the hold release request information transmitting part 9 via the I field data transmitting part 53. At the terminal adapter which receives the I field data, the hold release request information processing part 10 carries out the connection release process with respect to the destination terminal via the connection control part 41a, that is, transmits the REQUEST which is OFF, and releases the held channel. As a result, it is possible to prevent unnecessary holding of the channel.

Next, a description will be given of the operation of this embodiment for the case where it is known in advance that there is no need to hold the channel with respect to the destination terminal after the data transmission ends when the transmitting terminal makes the connection request with respect to the destination terminal. In this case, the hold disuse information transmitting part 7 of the terminal turns the REQUEST ON and transmits the connection information to the terminal adapter via the I field data transmitting part 53 when the terminal makes the first connection request, by including the hold disuse information in the connection information to indicate that it is unnecessary to hold the channel after the data transmission ends. At the terminal adapter which receives this connection information, the non-hold connection processing part 8 stores the information which indicates that the holding of the channel is unnecessary, and the connection release process is carried out immediately without holding the channel when the REQUEST which is OFF is received from the terminal at the end of the data transmission. For this reason, it is possible to completely eliminate the holding of the channel for a communication which is known in advance to require no holding of the channel.

Next, a description will be given of the operation of freely making the connection request, the connection release request, the hold request, the hold release request and the like described above with respect to an arbitrary terminal. In this case, the terminal adapter specifying part 11 specifies the terminal adapter which is coupled to the destination within the connection information when the transmitting terminal makes the request. In addition, the identification information of the destination terminal which is the subject of the control request and the connection hold control request information which includes the control request contents such as connect, connection release, hold and hold release are transmitted to the terminal adapter as data via the connection hold control request transmitting part 12. This transmission is made in the same manner as the normal data transmission to the destination terminal except that the destination in this case is the terminal adapter coupled to the transmitting terminal and not the designation terminal. Hence, the REQUEST is turned ON at the time of the request, and the data including the connection hold control request information is transmitted after the I field data.

At the terminal adapter, the terminal adapter communication identifying part 13 identifies that this connection request is intended for this terminal adapter, and transmits the data which is next input to the transmission buffer 43 to the terminal request processing part 14 and not to the ATM cell generating part 44. The terminal request processing part 14 analyzes the input data and transmits it to the connection control part 41a. The connection control part 41a makes access to the necessary processing parts to make the connect, connection release, hold or hold release with respect to the specified terminal depending on the request. In other words, the connection hold control can be made at an arbitrary time with respect to an arbitrary terminal.

Figure 2:
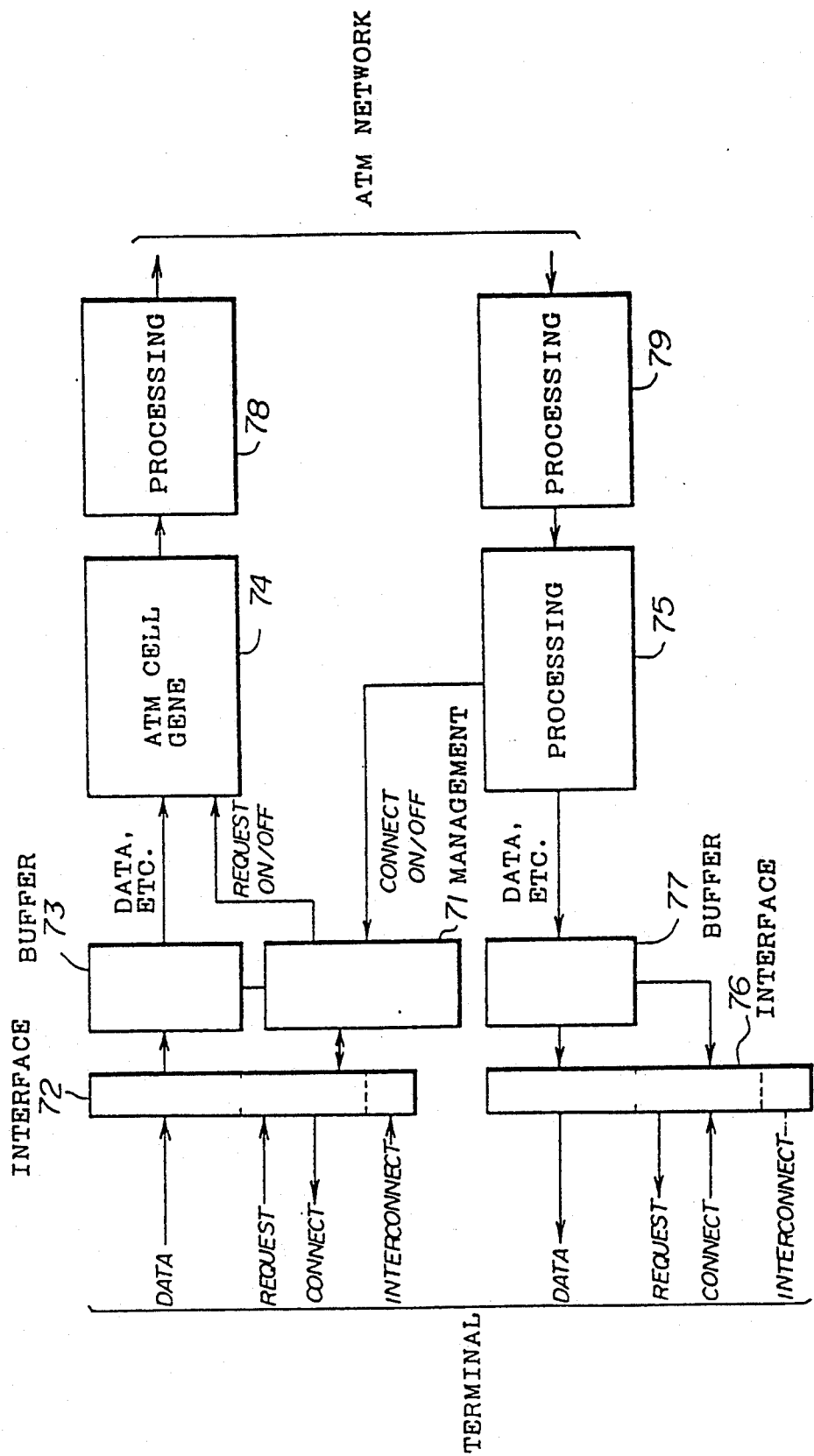
FIG. 2 is a system block diagram showing an example of a conventional terminal adapter.
Figure 3:
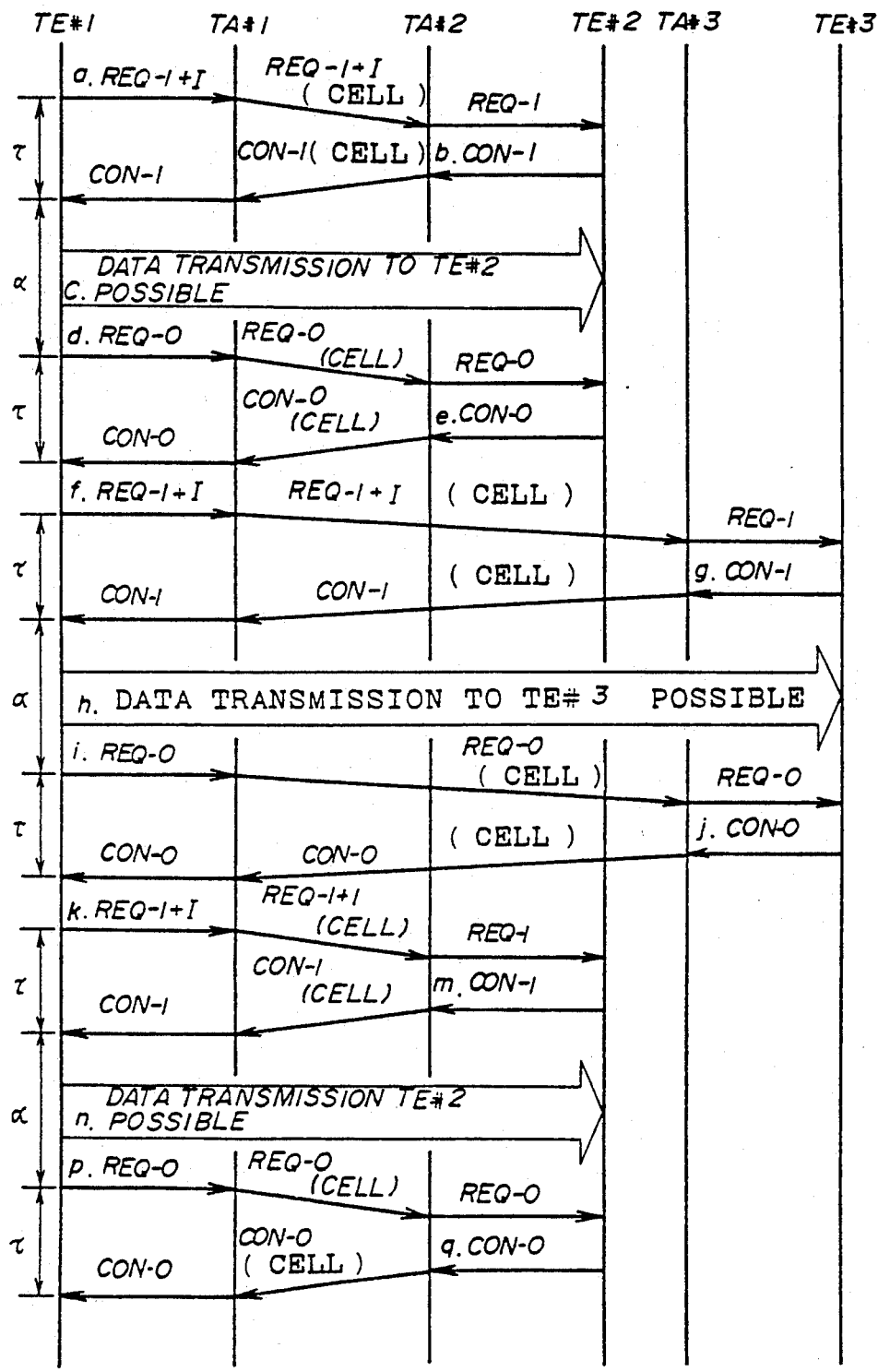
FIG. 3 is a sequence diagram for explaining the operation sequence of the prior art.

FIGS. 13 and 14 show the sequences for the basic network structure shown in FIG. 1, and those parts which are the same as those corresponding parts of the prior art described in conjunction with FIGS. 1 through 3 are designated by the same reference numerals and a description thereof will be omitted.

A description will first be given of the basic sequence shown in FIG. 13. First, the terminal TE#1 transmits data to the terminal TE#2 and the connection release request is made similarly as in the case of the prior art shown in FIG. 3, as shown by "a" through "d". As shown by "e", the terminal adapter TA#1 immediately returns CON-0 to the terminal TE#1 when REQ-0 is received, and at the same time, starts a timer as shown by "d".

Next, the terminal TE#1 transmits data to the terminal TE#3, and transmits REQ-0 to the terminal adapter TA#1 when this data transmission ends as shown by "f" through "i". Then, the terminal adapter TA#1 returns CON-0 to the terminal TE#1, but the channel with respect to the terminal TE#3 is held and the timer is started.

If the connection request REQ-1 with respect to the terminal TE#2 is transmitted again from the terminal TE#1 to the terminal adapter TA#1 before the time T set by the timing with respect to the terminal TE#2 elapses as shown by "k", the terminal adapter TA#1 immediately returns CON-1 as shown by "m". Hence, the terminal TE#1 can immediately transmit data as shown by "n". The process after the end of the second communication is carried out similarly as in the previous communication, as shown by "p" and "q".

Thereafter, if there is no connection request with respect to the terminal TE#3 and the time T elapses, the terminal adapter TA#1 sends REQ-0 to the terminal TE#3 as shown by "r". When CON-0 is returned from the terminal TE#3 via the terminal adapter TA#3, the channel with respect to the terminal TE#3 is released as shown by "s". The operation is similarly carried out with respect to the terminal TE#2 when there is no connection request with respect to the terminal TE#2 and the time T elapses.

As described above, when the connection request with respect to the same destination terminal is made at short time intervals, the time required for the re-connection becomes $\beta$ as shown in FIG. 13 which is short compared to the original time $\tau$ which is required for the connection. For this reason, the data communication is greatly improved when the data transmission is alternately made with respect to a plurality of terminals.

Next, a description will be given of an embodiment of the hold release sequence, by referring to FIG. 14. FIG. 14 shows a case where the hold release request is made after once sending the connection release request.

The sequence is the same as that shown in FIG. 13 up to the end of the data communication from the terminal TE#1 to the terminal TE#2, as shown by "a"through "e". It is assumed that the terminal TE#1 is the destination terminal which made the connection release request immediately before and that the hold release request is made with respect to the terminal TE#2 as shown by "f". As described above, the hold release request is made by the control signal or the connection information.

When the terminal adapter TA#1 receives the connection release request, the terminal adapter TA#1 sends REQ-0 with respect to the terminal TE#2. The terminal #2 which receives this REQ-0 returns CON-0 the terminal adapter TA#2, and the channel held with respect to the terminal TE#2 is released as shown by "f" and "g".

Thereafter, the terminal TE#1 carries out a data transmission with respect to the terminal TE#3 as shown by "h" through "m", but this is the same as in the case shown in FIG. 13.

Next, a description will be given of the general processes of realizing the aspects of the present invention described above in conjunction with FIGS. 4 through 10 in this embodiment.

Figure 15:
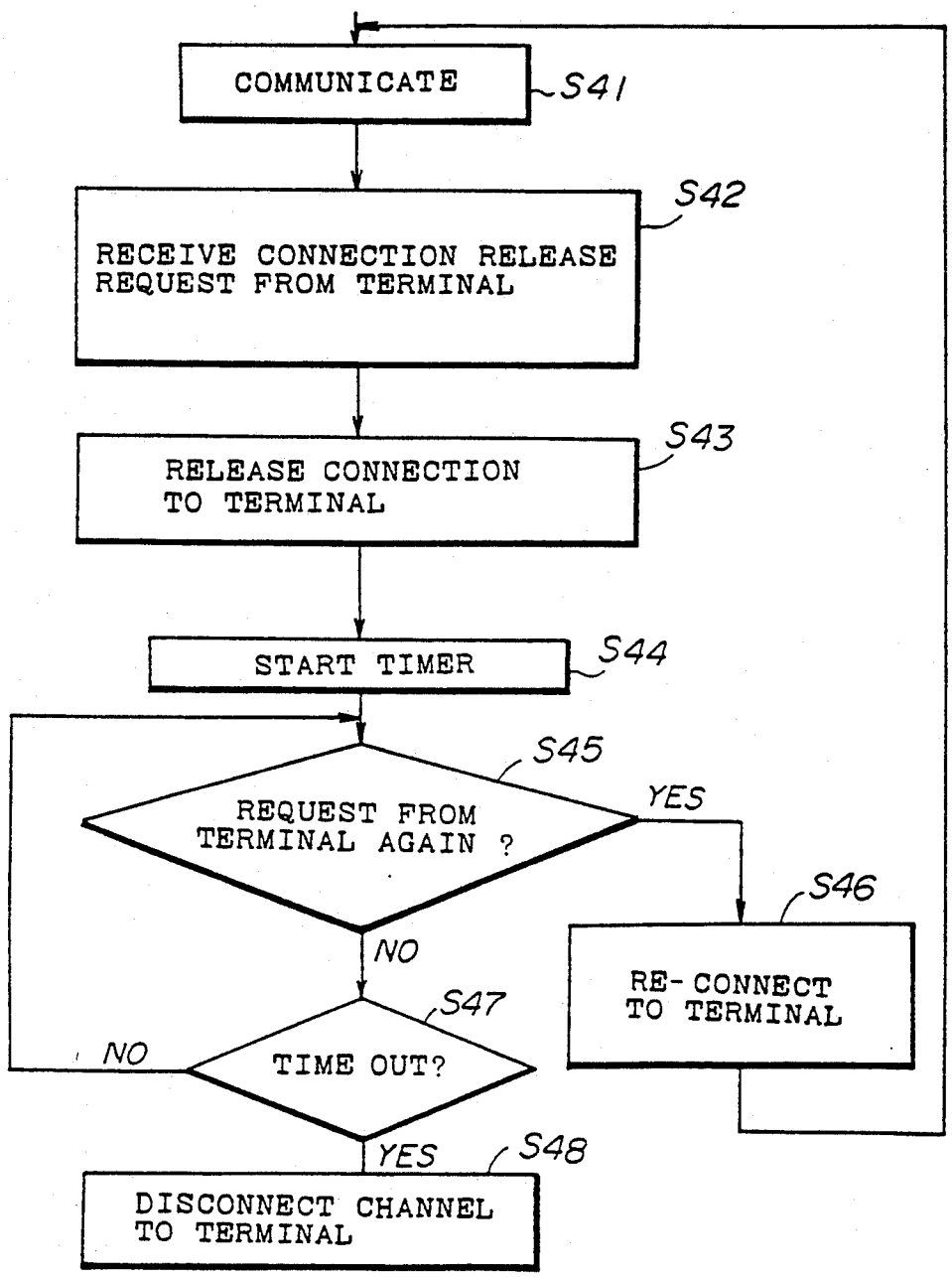
FIGS. 15 through 21 respectively are flow charts for explaining the operating principles of the present invention described in conjunction with FIGS. 4 through 10 in the embodiment of the connection hold control system according to the present invention.

The case shown in FIG. 4 can be realized by the operation shown in FIG. 15. In FIG. 15, a step S41 performs data communication, and a step S42 receives the connection release request from the terminal by the terminal request processing part 14 of the terminal adapter. Hence, REQ-0 is output from the connection control part 51 of the terminal. A step S43 releases the connection only with respect to the terminal by the connection control part 41a of the terminal adapter. Hence, CON-0 is transmitted. A step S44 starts a timer, and a step S45 decides whether or not the connection request is again made from the terminal, that is, whether or not REQ-1 is received. If the decision result in the step S45 is YES, a step S46 again connects to the terminal by transmitting CON-1, and the process returns to the step S41. On the other hand, if the decision result in the step S45 is NO, a step S47 decides whether or not the predetermined time has elapsed from the time when the timer is started. The process returns to the step S45 if the decision result in the step S47 is NO, but a step S48 disconnects the channel with respect to the destination terminal (terminal adapter) if the decision result in the step S47 is YES.

Figure 16:
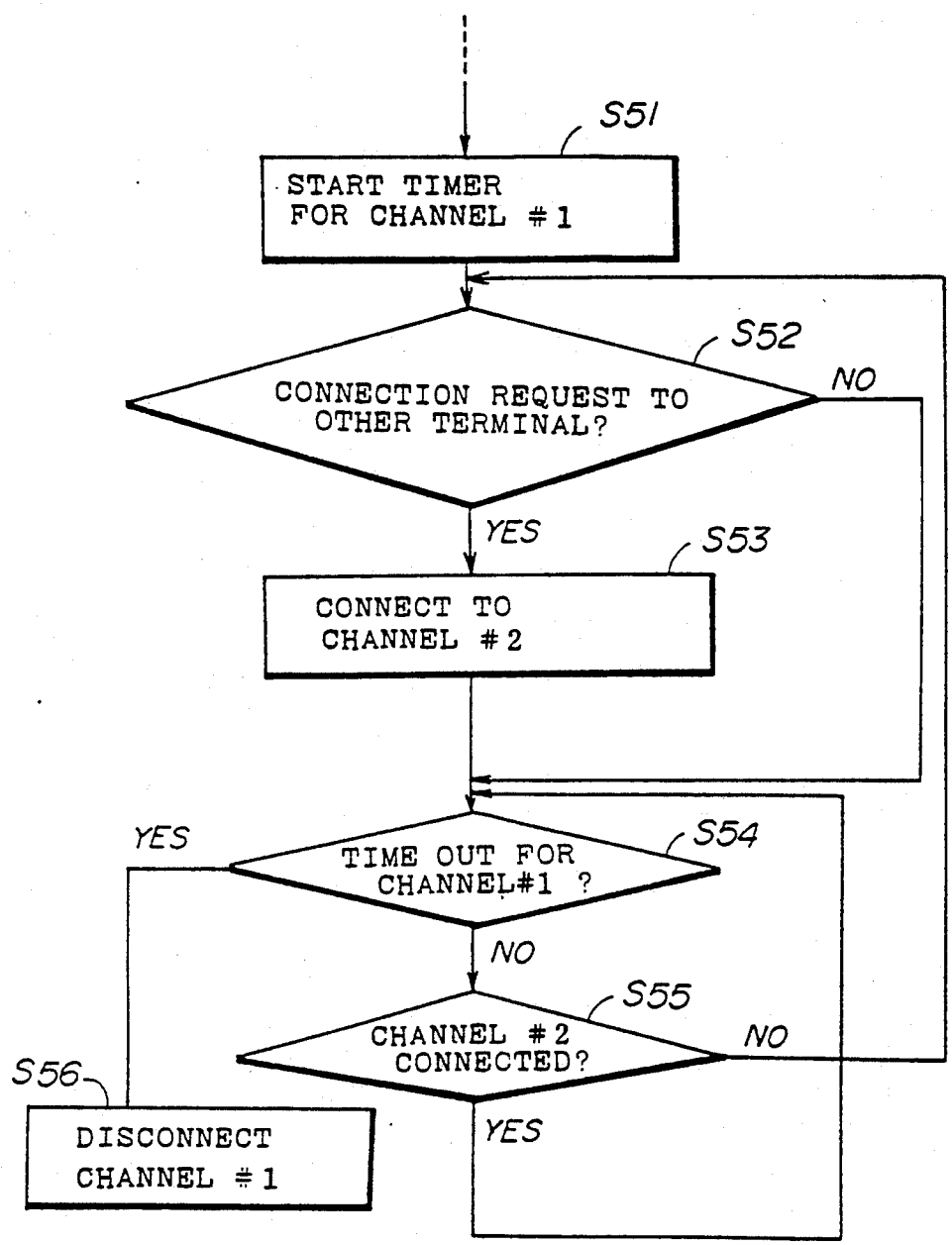

The case shown in FIG. 5 can be realized by the operation shown in FIG. 16. In FIG. 16, a step S51 starts a timer for a channel connected to the terminal TE#1 after steps (not shown) are carried out to make a communication. A step S52 decides in the terminal request processing part 14 whether or not there is a connection request to another terminal TE#2, for example. If the decision result in the step S52 is YES, a step S53 carries out a connection process for a channel which is connected to the terminal TE#2. On the other hand, if the decision result in the step S52 is NO or after the step S53, a step S54 decides whether or not a predetermined time has elapsed for the channel which is connected to the terminal TE#1. A step S55 decides whether or not a connection exists for the channel which is connected to the terminal TE#2 if the decision result in the step S54 is NO. The process returns to the step S52 if the decision result in the step S55 is NO, but returns to the step S54 if the decision result in the step S55 is YES. A step S56 disconnects the channel connected to the terminal TE#1 if the decision result in the step S54 is YES.

Figure 17:
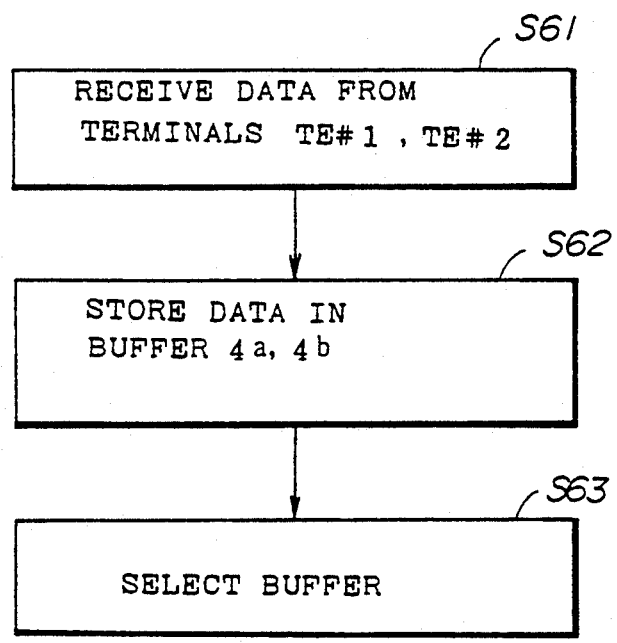

The case shown in FIG. 6 can be realized by the operation shown in FIG. 17. In FIG. 17, a step S61 receives the data from the terminals TE#1 and TE#2 at the ATM cell reception processing part 45. A step S62 matches the ATM headers at the ATM cell reception processing part 45, so as to store the data from the terminals TE#1 and TE#2 independently to the respective reception buffers 4a and 4b. Then, a step S63 selects one of the reception buffers 4a and 4b corresponding to the presently connected HIPPI by the 2:1 selector 4c, and transmits the data read from the selected reception buffer.

Figure 18:
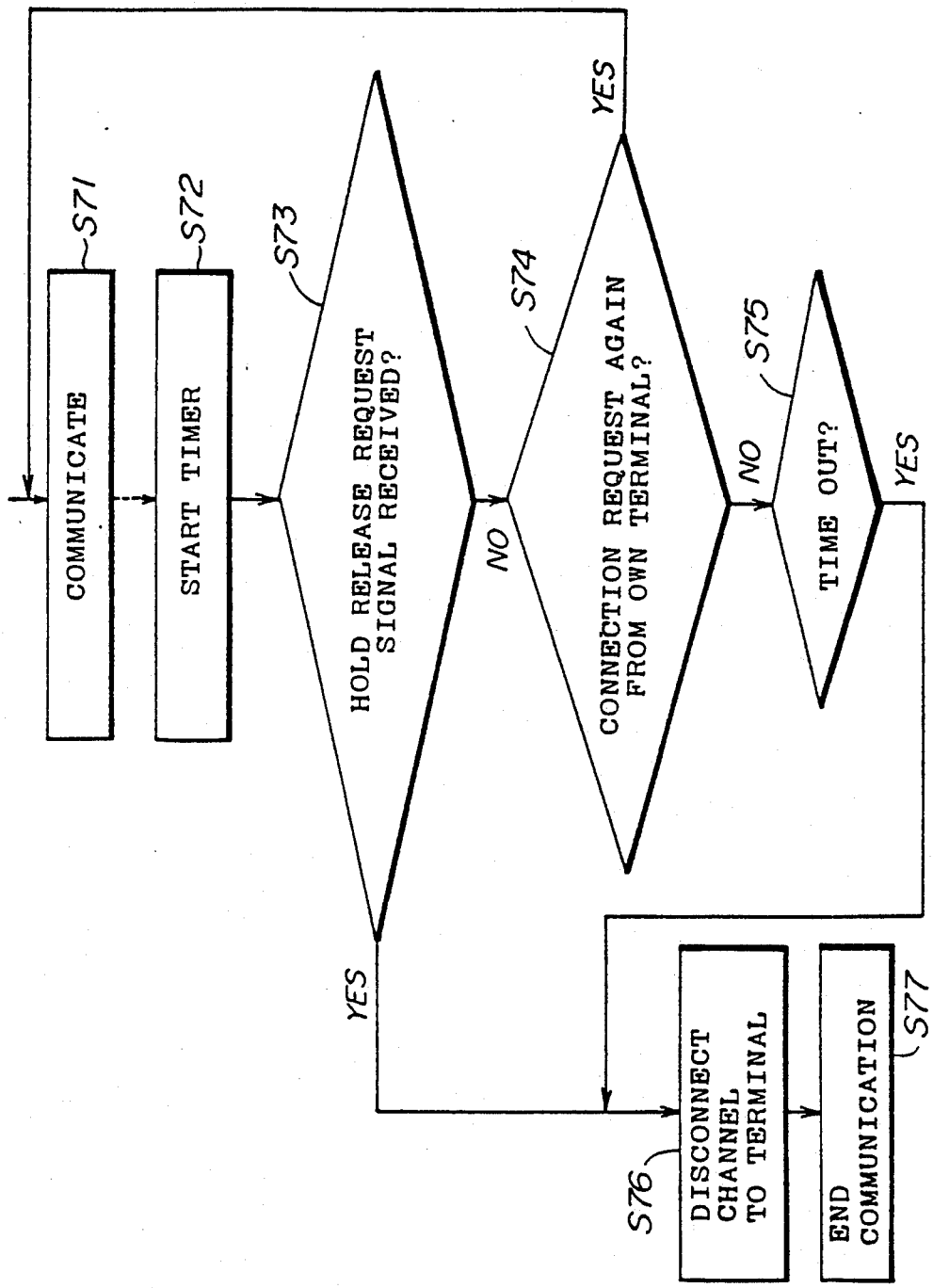
Figure 19:
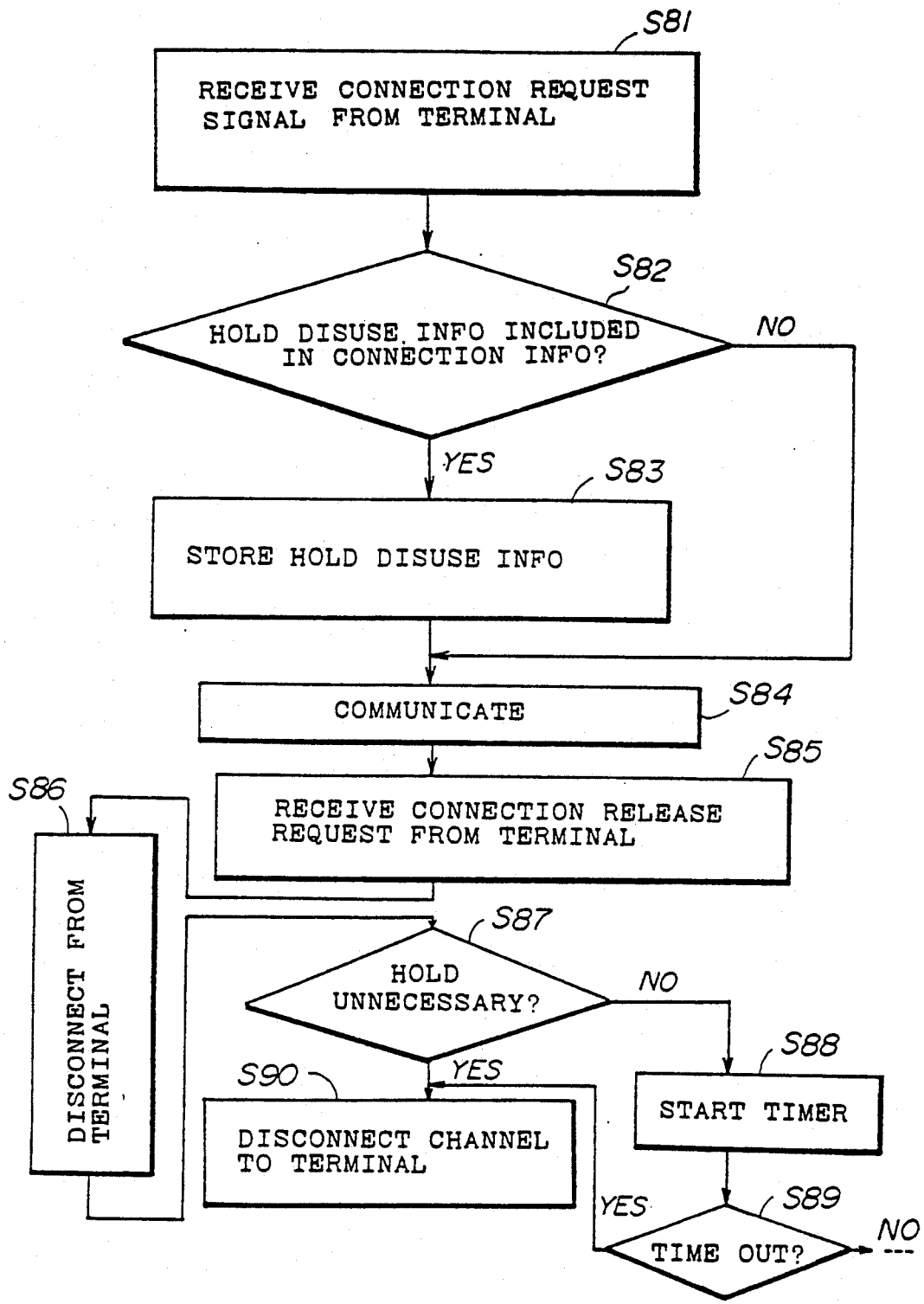

The case shown in FIG. 7 can be realized by the operation shown in FIG. 18. In FIG. 18, a step S71 performs data communication, and steps similar to the steps S42 and S43 shown in FIG. 15 are carried out, for example. Then, a step S72 starts a timer, and a step S73 decides whether or not the hold release request signal is received by the hold release processing part 6 of the terminal adapter. For example, this decision may be made based on whether or not the REQUEST changes from ON to OFF for a short time. If the decision result in the step S73 is NO, a step S74 decides whether or not the terminal connected to this terminal adapter has again made a connection request, that is, whether or not REQUEST is ON. The process returns to the step S71 if the decision result in the step S74 is YES, but a step S75 decides whether or not the predetermined time has elapsed from the start of the timer if the decision result in the step S74 is NO. If the decision result in step S73 or S75 is YES, a step S76 disconnects the channel which connects to the destination terminal, and a step S77 ends the communication, The case shown in FIG. 8 can be realized by the operation shown in FIG. 19. In FIG. 19, a step S81 receives the connection request signal from the terminal, that is, REQ-1. A step S82 decides whether or not the hold disuse information is included in the connection information. A step S83 stores the information which indicates no need to hold the channel in the non-hold connection processing part 8 of the terminal adapter. After the step S83 or if the decision result in the step S82 is NO, a step S84 performs data communication. A step S85 receives the connection release request from the terminal by the connection control part 51, that is, REQ-0. A step S86 disconnects the connection with the terminal by turning the CONNECT OFF. Then, a step S87 decides whether or not the holding of the channel is necessary. A step S88 starts a timer if the decision result in the step S87 is NO, and steps similar to the steps S73 and S74 shown in FIG. 18, for example, are carried out. A step S89 decides whether or not the predetermined time has elapsed from the start of the timer, and a step S90 disconnects the channel to the destination terminal the decision result in the step S89 is YES.

Figure 20:
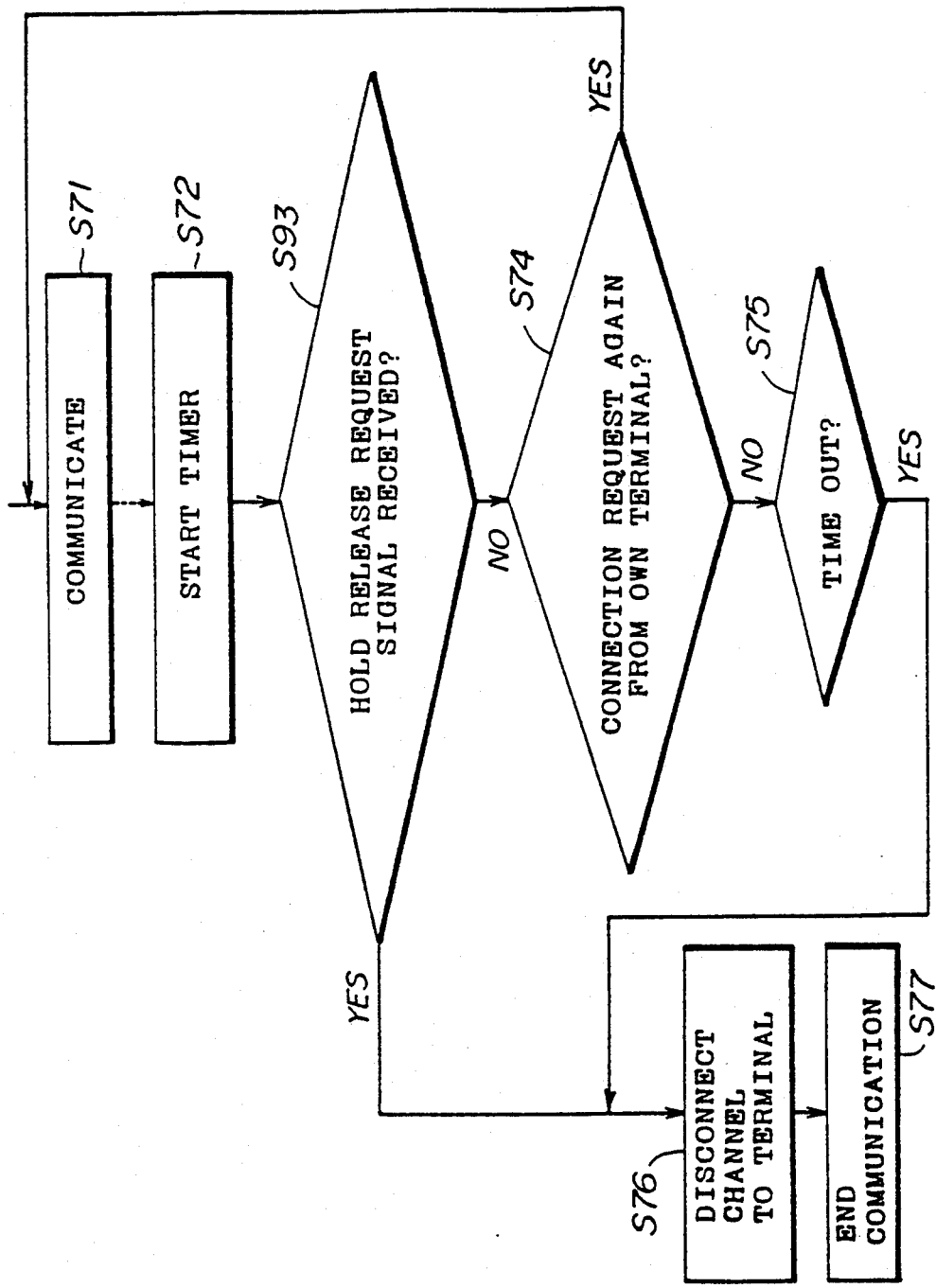

The case shown in FIG. 9 can be realized by the operation shown in FIG. 20. In FIG. 20, those parts which are the same as those corresponding parts in FIG. 18 are designated by the same reference numerals, and a description thereof will be omitted. The method of transmitting the hold release request signal in FIG. 20 is different from that of FIG. 18. In other words, in FIG. 20, a step S93 decides whether or not the hold release request signal is received by the terminal adapter identifying part 13 of the terminal adapter. Hence, although the hold release request signal is transmitted using the control signal in FIG. 18, the hold release request is made by the communication to the terminal adapter in FIG. 20, and the information indicating the hold release request is included in the connection information or data.

Figure 21:
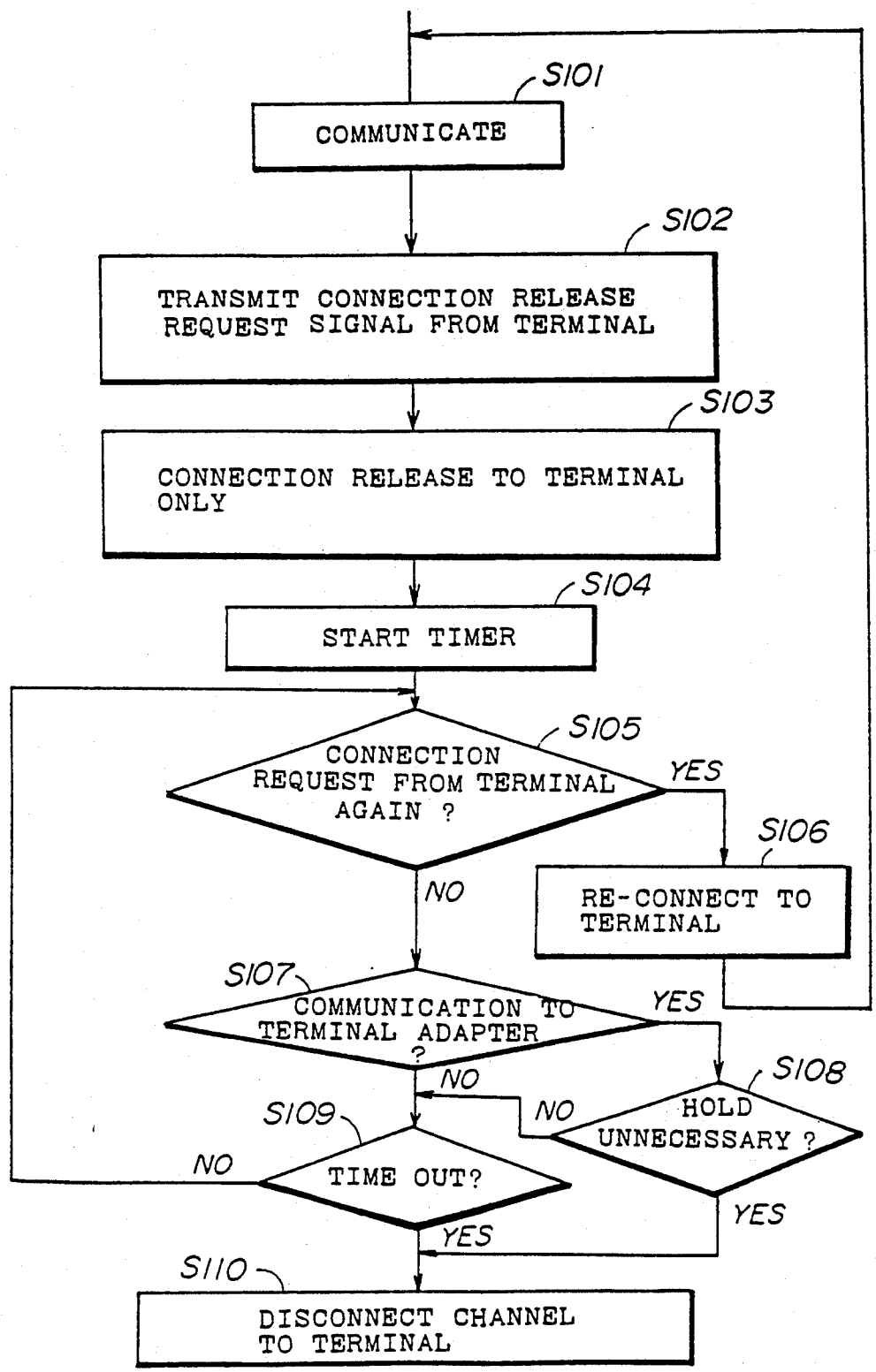

The case shown in FIG. 10 can be realized by the operation shown in FIG. 21. In FIG. 21, a step S101 communicates with the destination terminal, and a step S102 receives the connection release request signal from the terminal, that is, REQ-0 from the connection control part 51. A step S103 releases the connection to the terminal by the connection control part 41a of the terminal adapter by CON-0. A step S104 starts a timer. A step S105 decides whether or not a connection request is again made from the terminal, that is, whether or not REQ-1 is received. A step S106 again makes a connection to the terminal by CON-1 if the decision result in the step S105 is YES, and the process returns to the step S101. On the other hand, if the decision result in the step S105 is NO, a step S107 decides whether or not there is a communication to the terminal adapter. A step S108 decides whether or not the holding of the channel is necessary if the decision result in the step S107 is YES. A step S109 decides whether or not the predetermined time has elapsed from the start of the timer if the decision result in the step S107 or S108 is NO. The process returns to the step S105 if the decision result in the step S109 is NO, and a step S110 disconnects the channel to the destination terminal if the decision result in the step S109 is YES.

FIGS. 11 through 14 merely are used to describe one embodiment, and various modifications of the present invention are possible depending on the structures of the terminal and the terminal adapter.

For example, FIG. 11 shows a case where the connection control part 41a and various processing parts are provided independently within the management part 41, but it may be readily seen that a part of or all of the elements forming the management part 41 may be formed as a single processing part. In addition, the described embodiment uses the terminal provided with the HIPPI and the terminal adapter which is coupled to the ATM network, but the terminal interface and the network are not limited to those of the described embodiment.

Further, the present invention is not limited to these embodiments, but various variations and modifications may be made without departing from the scope of the present invention.

What is claimed is:

1. A connection hold control system in an interface between a first terminal and a communication network providing communication channels for data communication to a second terminal and a third terminal, said connection hold control system comprising:
   hold means for delaying release of a first channel connecting the first and second terminals via the communication network after completion of data communication from the first terminal to the second terminal; and
   connect means for connecting the first and second terminals via the first channel if data communication from the first terminal to the third terminal via a second channel ends within a predetermined time after the data communication from the first terminal to the second terminal ends.

2. The connection hold control system as claimed in claim 1,
   wherein said hold means includes:
   means for sending a connection release acknowledge signal which indicates a release of the first channel to the first terminal while holding the first channel when a connection release request signal is received from the first terminal after completion of data communication between the first terminal and the second terminal via the first channel in the communication network, and
   means for releasing the first channel which is held after the predetermined time elapses from a time when the first channel is held, and
   wherein said connect means includes re-connect means for immediately enabling a data communication via the first channel which is held if a connection request to the second terminal is received from the first terminal before the predetermined time elapses from the time when the first channel is held.

3. The connection hold control system as claimed in claim 1, wherein said connect means includes connection switch means for setting the second channel to the third terminal while holding the first channel to the second terminal if a connection request to the third terminal is received from the first terminal while the first channel to the second terminal is held.

4. The connection hold control system as claimed in claim 1, wherein the first terminal alternately receives data from the second and third terminals via the communication network, and
   wherein the connection hold control system further comprises plural data storage means for temporarily storing data received from the second and third terminals when the data is received from the third terminal in a first state where the first channel to the second terminal is held and when the data is received from the second terminal in a second state where the second channel to the third terminal is held, and for transmitting the data temporarily stored to the first terminal independently for each terminal from which the data is received.

5. The connection hold control system as claimed in claim 1, further comprising:
   hold release request signal transmitting means, provided within the first terminal, for sending a hold release request signal which request a release of the first channel which is held using a part of a control signal after a connection release request signal is sent at the completion of data transmission using the first channel, and
   hold release means for carrying out a connection release process with respect to the second terminal via the communication network in response to the hold release request signal.

6. The connection hold control system as claimed in claim 1, further comprising:
   hold disuse information transmitting means, provided within the first terminal, for transmitting to the first terminal adapter hold disuse information which indicates no need to hold the first channel after the data transmission to the second terminal ends if it is known when a connection request is made from the first terminal that holding of the first channel to the second terminal is unnecessary after the data communication with the second terminal ends, said hold disuse information being included in connection information which is transmitted together with a connection request signal which is transmitted with respect to the second terminal, and
   non-hold connection processing means for immediately carrying out a connection release process in response to the hold disuse information without holding the first channel when a connection release request is received from the first terminal at the completion of the data communication with the second terminal.

7. The connection hold control system as claimed in claim 1,
   wherein said hold and connect means for the first terminal are disposed in a first terminal adapter operatively connected to said first terminal and the communication network, and
   wherein the connection hold control system further comprises:
   hold release request information transmitting means, provided within the first terminal, for transmitting hold release request information which is made up of information which specifies the first terminal adapter as a destination and information which requests release of the first channel which is used for an immediately preceding data transmission to the second terminal, said hold release request information being included in connection information which is transmitted together with a connection request signal after the data communication with the second terminal ends, and hold release request information processing means, provided within the first terminal adapter, for releasing the first channel which is used for the immediately preceding data transmission to the second terminal which ended when the hold release request information is received from the first terminal together with the connection request signal.

8. The connection hold control system as claimed in claim 1, wherein said hold and connect means for the first terminal are disposed in a first terminal adapter operatively connected to said first terminal and the communication network, and wherein the connection hold control system further comprises:

terminal adapter specifying means, provided with the first terminal, for transmitting terminal adapter specifying information which specifies the first terminal adapter as a destination, said terminal adapter specifying information being included within connection information which is transmitted together with a connection request signal, connection hold control request transmitting means, provided within the first terminal, for transmitting data identification information related to one of the second and third terminals to which a control request is to be made and connection hold control request information which includes a control request content selected from a group consisting of connect, connection release, hold and hold release, terminal adapter communication identifying means, provided within the first terminal adapter, for detecting data received from the first terminal following the terminal adapter specifying information within the first terminal adapter without transmitting the data to the communication network, and terminal request processing means, provided within the first terminal adapter, for carrying out a process of connect, connection release, hold and hold release with respect to one of the second and third terminals which is specified by the connection hold control request information included in the data which is received from the first terminal following the terminal adapter specifying information, so that a connection hold control is possible with respect to an arbitrary terminal by data communication between the first terminal and the first terminal adapter.

9. The connection hold control system as claimed in claim 1, wherein the communication network includes an asynchronous transfer mode (ATM) network.

10. The connection hold control system as claimed in claim 9, wherein each terminal is provided with a high performance parallel interface (HIPPI).

11. A connection hold control method adapted to a data communication system in which data communication is alternately made between a first terminal and a second terminal and between the first terminal and a third terminal, each of the first, second and third terminals being coupled to a communication network via first, second and third terminal adapters, respectively, said connection hold control method comprising the steps of:

(a) holding, within the first terminal adapter, a first channel which connects the first and second terminals via the communication network and the first and second terminal adapters after completion of data communication from the first terminal to the second terminal; and (b) connecting, within the first terminal adapter, the first and second terminals via the first channel if data communication from the first terminal to the third terminal via a second channel ends within a predetermined time after completion of the data communication from the first terminal to the second terminal ends.

12. The connection hold control method as claimed in claim 11, wherein said holding in step (a) includes the substeps of:

sending a connection release acknowledge signal which indicates a release of the first channel to the first terminal while holding the first channel when a connection release request signal is received from the first terminal after the first terminal adapter completes the data communication with the second terminal via the communication network, and releasing the first channel which is held after the predetermined time elapses from a time when the first channel is held, and wherein said connecting in step (b) includes the substep of immediately enabling data communication via the first channel which is held if a connection request to the second terminal is received from the first terminal before the predetermined time elapses from the time when the first channel is held.

13. The connection hold control method as claimed in claim 11, wherein said holding in step (a) includes the substep of setting the second channel to the third terminal while holding the first channel to the second terminal if a connection request to the third terminal is received from the first terminal in a state where the first channel to the second terminal is held.

14. The connection hold control method as claimed in claim 11, wherein the connection hold control method further comprises the steps of:

(c) alternately receiving at the first terminal data from the second and third terminals via the communication network and the first, second and third terminal adapters, (d) temporarily storing, within the first terminal adapter, the data received from the second and third terminals when the data is received from the second terminal in a first state where the second channel connecting the third terminal and the first terminal adapter is held and when the data is received from the third terminal in a second state where the first channel connecting the second terminal and the first terminal adapter is held, and (e) transmitting the data temporarily stored in step (d) to the first terminal independently for each terminal from which the data is received.

15. The connection hold control method as claimed in claim 11, further comprising the steps of:

(c) sending from the first terminal a hold release request signal which request a release of the first channel which is held by the first terminal adapter using a part of a control signal after sending a connection release request signal to the first terminal adapter at an end of data transmission using the first channel, and (d) carrying out a connection release process within the first terminal adapter with respect to the second terminal via the communication network in response to the hold release request signal.

16. The connection hold control method as claimed in claim 11, further comprising the steps of:

(c) transmitting from the first terminal to the first terminal adapter hold disuse information which indicates no need to hold the first channel after the data transmission to the second terminal ends if it is known when a connection request is made from the first terminal that the holding of the first channel to the second terminal is unnecessary after the data communication with the second terminal ends, said hold disuse information being included in connection information which is transmitted together with a connection request signal which is transmitted with respect to the second terminal, and (d) immediately carrying out a connection release process within the first terminal adapter in response to the hold disuse information without holding the first channel when a connection release request is received from the first terminal at the completion of the data communication with the second terminal.

17. The connection hold control method as claimed in claim 11, further comprising the steps of:

(c) transmitting from the first terminal hold release request information which is made up of information which specifies the first terminal adapter as a destination and information which requests release of the first channel which is used for an immediately preceding data transmission to the second terminal, said hold release request information being included in connection information which is transmitted together with a communication with the second terminal ends, and (d) releasing from the first terminal adapter the first channel which is used for the immediately preceding data transmission to the second terminal which ended when the hold release request information is received from the first terminal together with the connection request signal.

18. The connection hold control method as claimed in claim 11, further comprising the steps of:

(c) transmitting from the first terminal terminal adapter specifying information which specifies the first terminal adapter as a destination, said terminal adapter specifying information being included within connection information which is transmitted together with a connection request signal, (d) transmitting from the first terminal data identification information related to one of the second and third terminals to which a control request is to be made and connection hold control request information which includes a control request content selected from a group consisting of connect, connection release, hold and hold release, (e) detecting data received from the first terminal following the terminal adapter specifying information within the first terminal adapter without transmitting the data to the communication network, and (f) carrying out a process of connect, connection release, hold and hold release within the first terminal adapter with respect to one of the second and third terminals which is specified by the connection hold control request information included in the data which is received from the first terminal following the terminal adapter specifying information, so that a connection hold control is possible with respect to an arbitrary terminal by data communication between the first terminal and the first terminal adapter.

19. The connection hold control method as claimed in claim 11, wherein said connecting in step (b) connects the first and second terminals via the communication network including an asynchronous transfer mode (ATM) network.

20. The connection hold control method as claimed in claim 19, further comprising the step of (c) communicating with each terminal via a high performance parallel interface (HIPPI).

* * * * *